(12) United States Patent
Chavda et al.

(10) Patent No.: US 7,992,031 B2
(45) Date of Patent: Aug. 2, 2011

(54) AUTOMATED DISASTER RECOVERY PLANNING

(75) Inventors: Kavita Chavda, Atlanta, GA (US); Mickey Iqbal, Atlanta, GA (US); Seshashayee S. Murthy, Somers, NY (US); Ramani R. Routray, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/508,783

(22) Filed: Jul. 24, 2009

(65) Prior Publication Data
US 2011/0022879 A1 Jan. 27, 2011

(51) Int. Cl.
*G06F 11/00* (2006.01)
(52) U.S. Cl. .................................. 714/2; 714/1
(58) Field of Classification Search .................. 714/2, 1, 714/4.1, 6.12, 38.1, 41, 47.1, 48
See application file for complete search history.

(56) References Cited

U.S. PATENT DOCUMENTS

| 7,685,187 B2* | 3/2010 | Hutchinson et al. .......... 707/674 |
| 2003/0005358 A1 | 1/2003 | Koelle et al. |
| 2004/0153708 A1 | 8/2004 | Joshi et al. |
| 2005/0065807 A1 | 3/2005 | DeAngelis et al. |
| 2006/0112244 A1 | 5/2006 | Buah et al. |
| 2007/0043581 A1* | 2/2007 | Chouanard et al. ............... 705/1 |
| 2007/0078861 A1 | 4/2007 | Aidun |
| 2009/0150712 A1* | 6/2009 | Balasubramanian et al. .... 714/1 |

OTHER PUBLICATIONS

Adobe Flash. [online]. 15 pages. [retrieved on Jul. 8, 2009]. Retrieved from the Internet< URL: http://en.wikipedia.org/ wiki/Adobe_flash>.

DR Plan Overview. [online]. 1 page. [retrieved on Apr. 7, 2009]. Retrieved from the Internet< URL: http://www.drplanning.org/portal/index.php?option=com_content&view=%20article&id=26&Itemid=69>.

Dean, J. and Ghemawat, S. MapReduce: Simplified Data Processing on Large Clusters. Communications of the ACH. Jan. 2008, vol. 51, No. 1, pp. 107-113.

EMC(R) SRDF(R): Zero Data Loss Solutions for Extended Distance Replication. Technical Note: P/N 300-006-714, Rev A03, Apr. 14, 2009. [online]. 44 pages. [retrieved on Apr. 27, 2009]. Retrieved from the Internet< URL: http://www.emc.com/products/detail/software/srdf.htm>.

Castets et al. IBMTotalStorage Enterprise Storage Server PPRC Extended Distance. IBM RedBook, Jun. 2002, SG24-6568-00; ISBN 0738425303. [online]. 184 pages. [retrieved on Apr. 27, 2009]. Retrieved from the Internet< URL: http://www.redbooks.ibm.com/redbooks/pdfs/sg246568.pdf>.

* cited by examiner

*Primary Examiner* — Dieu-Minh Le
(74) *Attorney, Agent, or Firm* — Schmeiser, Olsen & Watts; Anna L. Linne

(57) ABSTRACT

A system and associated method for automated disaster recovery (DR) planning. A DR planning process receives disaster recovery requirements and a target environment configuration from a user to design DR plans for the target environment configuration that meets disaster recovery requirements. The DR planning process accesses a knowledgebase containing information on replication technologies, best practice recipes, and past deployment instances. The DR planning process creates the DR plans by analyzing the disaster recovery requirements into element risks, associating replication technologies to protect each element risks, combining associated replication technologies based on the best practice recipes, and selecting highly evaluated combination based on the past deployment instances. The DR planning process presents the DR plans as classified by replication strategy-architecture combination for each DR plans and marks how strongly each DR plans are recommended.

20 Claims, 17 Drawing Sheets

AUTOMATED DISASTER RECOVERY PLANNING

BACKGROUND OF THE INVENTION

The present invention discloses a system and associated method for automated disaster recovery (DR) planning for a computing environment to meet requisite DR objectives of the computing environment. Conventional DR planning is manually performed by human experts according to rules-of-thumb and heuristics. Thus, conventional DR plans are expensive to devise and inefficient to keep up the rapidly changing computing environments. Also, because of differences in expertise of respective DR designers, conventional DR plans for a same set of computing environment and DR objectives vary significantly and are unable to standardize and/or to optimize.

BRIEF SUMMARY

According to one embodiment of the present invention, a method for automated disaster recovery (DR) planning comprises receiving disaster recovery requirements and a target environment configuration from a user, wherein the target environment configuration defines a target computing environment in which at least one disaster recovery (DR) plan is to be deployed, and wherein the disaster recovery requirements defines objectives of said at least one DR plan; a processor of a computer system ranging the disaster recovery requirements in at least one element, wherein each element of said at least one element is a unit risk in the target computing environment to protect with said at least one DR plan, wherein said each element comprises replication properties that are required to prevent said each element; restricting candidate replication technologies for said each element from replication technologies stored in a knowledgebase coupled to the computer system, wherein a resource configuration of the candidate replication technologies match the target environment configuration, and wherein replication properties of the candidate replication technologies match replication properties of said each element; generating said at least one DR plan with candidate replication technologies for all elements based on best practice recipes and past deployment instances stored in the knowledgebase; and presenting, to the user, an output comprising said at least one DR plan from said generating.

According to one embodiment of the present invention, a computer program product comprises a computer readable memory unit that embodies a computer readable program code. The computer readable program code contains instructions that, when executed by a processor of a computer system, implement a method for automated disaster recovery (DR) planning.

According to one embodiment of the present invention, a computer system comprises a processor and a computer readable memory unit coupled to the processor, wherein the computer readable memory unit containing instructions that, when executed by the processor, implement a method for automated disaster recovery (DR) planning.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for automated disaster recovery (DR) planning.

DETAILED DESCRIPTION

Figure 1:
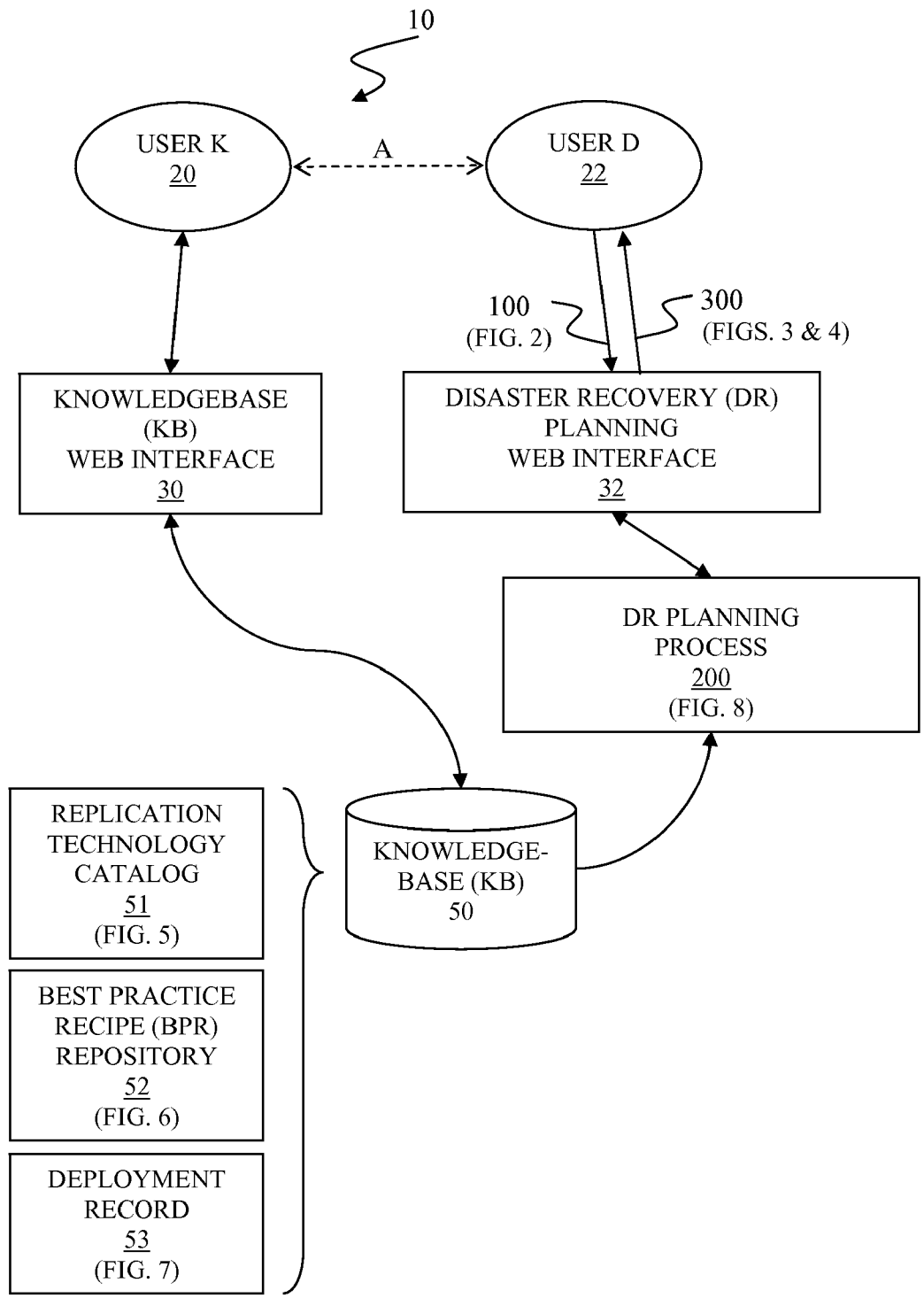
FIG. 1 illustrates a system for automated disaster recovery (DR) planning, in accordance with embodiments of the present invention.

FIG. 1 illustrates a system 10 for automated disaster recovery (DR) planning, in accordance with embodiments of the present invention.

A disaster recovery (DR) planning is a process developing a disaster recovery (DR) plan that is a solution to disasters that may occur in a target computing environment in which the DR plan will be deployed. Examples of the disaster may include, inter alia, damages to computing centers, subsystem failures, computer virus and worm attacks, etc. Because disasters cause significant losses in terms of revenue as well as customer credibility, a DR plan to prevent the disasters and/or to protect essential information and service capabilities from the disasters is a critical part of any enterprises based on digital services such as financial service sector, data communication service sector, etc. The DR planning is required to minimize data losses and service downtimes caused by disasters as tailored by needs of a customer enterprise that utilizes the DR plan. In this specification, the terms "target computing environment," "target environment," "target IT environment," are used interchangeably to indicate an information technology (IT) environment that the DR plan generated by the automated DR planning will be deployed. The disaster recovery needs of the customer enterprise with respect to objectives to be achieved by the DR plan are collectively referred to as DR requirements.

The system 10 comprises a knowledgebase (KB) 50 and a disaster recovery (DR) planning process 200. A user K 20 administers the KB 50 through a knowledgebase (KB) web interface 30. A user D 22 devises an input 100 to the DR planning process 200 and examines an output 300 from the DR planning process 200 through a disaster recovery (DR) planning web interface 32. Although the user K 20 and the user D 22 are separately presented in terms of respective roles to the KB 50 and the DR planning process 200, the user K 20 and the user D 22 are not necessarily different entities. Wherein the user K 20 and the user D 22 are separate entities, the user K 20 and the user D 22 have a synchronized set of information for the knowledgebase 50 via off-line communication, etc., as indicated by an arrow A. In one embodiment of the present invention, the DR planning web interface 32 is implemented with Adobe® Flash® (Adobe and Flash are registered trademarks of Adobe Systems Incorporated in the United States and/or other countries). In one embodiment of the present invention, the KB web interface 30 is implemented with the Web Services Definition Language (WSDL).

The input 100 comprises disaster recovery (DR) requirements and target environment configuration. The disaster recovery (DR) requirements specify objectives to achieve with the automated DR planning. The target environment configuration describes the target environment for which the output 300 of the automated DR planning is created. See the description of FIG. 2, infra, for details of the input 100.

The output 300 comprises a strategy-architecture grid of at least one DR plan comprising a combination of replication technologies, performance attributes of the combination, cost, rating, and relevance. Each DR plan presented in the strategy-architecture grid meets the DR requirements of the input 100 and is deployable in the target environment described in the target environment configuration of the input 100. See the description of FIG. 3, infra, for details of the output 300.

The knowledgebase (KB) 50 stores information on available replication technologies for disaster recovery (DR) planning and examples with evaluation information in a respective canonical model such that content of each component of the knowledgebase 50 are utilized by the DR planning process 200 to create DR plans pursuant to the input 100. The knowledgebase 50 comprises a replication technology catalog 51, a best practice recipe repository 52, and a deployment record 53.

The replication technology catalog 51 stores attributes of replication technologies that should be taken into account by the DR planning process 200 to create DR plans according to the input 100. See description of FIG. 5, infra, for details of the replication technology catalog 51.

The best practice recipe repository 52 comprises definitions of best practice recipes for corresponding environment configurations. A respective best practice recipe represents rules on how to combine replication technologies to create DR plans for a corresponding environment configuration. See description of FIG. 6, infra, for details of the best practice recipe repository 52.

The deployment record 53 stores past deployment instances. The deployment record 53 is a repository to cumulate past deployment instances developed for different customer computing environments and DR scenarios. The DR planning process 200 utilized the deployment record 53 by mining past deployment instances that are applicable to a given input 100. See description of FIG. 7, infra, for details of the deployment record 53.

The contents of respective components of the knowledgebase 50 are updated by the user K 20 through the KB web interface 30 to reflect information on new replication technology, changes in environment configuration, feedbacks by customers on rating of DR plans that had been deployed in the past, customization of DR plans, etc.

The disaster recovery (DR) planning process 200 receives the input 100 from the user D 22 and creates the output 300 pursuant to information stored in the knowledgebase 50. The DR planning process 200 analyzes the DR requirements of the input 100, searches and selects replication technologies to meet DR requirements and the target environment configuration, creates DR plans from selected replication technologies pursuant to best practice recipes, and rates created DR plans based on characteristics of past deployment instances that are relevant to DR plans. The DR planning process 200 automatically performs steps that are taken by human experts to devise a DR plan in conventional DR planning. The DR planning process 200 formalizes and automates conventional DR planning by employing canonical data models of information necessary for DR planning. The DR planning process 200 creates DR plans that supports application-level disaster recovery such that an enterprise application that deploys the DR plan can provide services to end-users within the boundaries of DR objectives such as Recovery Point Objective (RPO), Recovery Time Objective (RTO), Latency impact, data consistency, etc. Recovery Point Objective (RPO) is defined as duration of time during which data loss is deemed acceptable, defined by application, in the event of a disaster-failover scenario. Recovery Time Objective (RTO) is defined as duration of time during which loss of service is deemed acceptable, defined by application, in the event of a disaster-failover scenario. The RTO is measured as duration of time from initial disaster declaration to having critical business processes available to end-users.

The DR planning process 200 comprises a RANGE subprocess, a RESTRICT subprocess, a REDUCE subprocess, and a RANK subprocess. See description of FIG. 8, infra, for details of the subprocesses of the DR planning process 200.

The user D 22 reviews the output 300 of the DR planning process 200. The user D 22 provides feedbacks with respect to, inter alia, evaluation of the output 300 including a decision whether or not to deploy a DR plan, a user profile describing DR requirements, responsibilities of the user partaking the profile, and performance priorities of application, etc. If the DR plan is selected for deployment, then the DR plan may be tagged for an implicit recommendation. Once the DR plan is deployed, system state of the target environment is measured to analyze the impact of the DR plan on the target environment. Information acquired through the feedbacks and/or measurements is provided to the user K 20 to update the best practice recipe repository 52 and/or the deployment record 53 of the knowledgebase 50.

The method of the present invention automatically and systematically designs at least one DR plan that provides a solution for a disaster recovery in an actual target environment, by accounting virtualized resource configuration of a target environment comprising multiple sites, multiple serial/parallel combinations of replication technologies, best practice recipes and past deployment instances. In contrast, conventional Disaster Recovery (DR) planning methods and systems primarily focus on efficiency of data replication mechanism. Conventional DR planning deals only with replication technologies based on specific storage technology rather than taking the virtualized resource configuration into account. Also, because conventional DR planning is performed by human experts, resulting DR plans are not systematically coherent with conditions of the DR plan but are subject to person-to-person variation.

Figure 2:
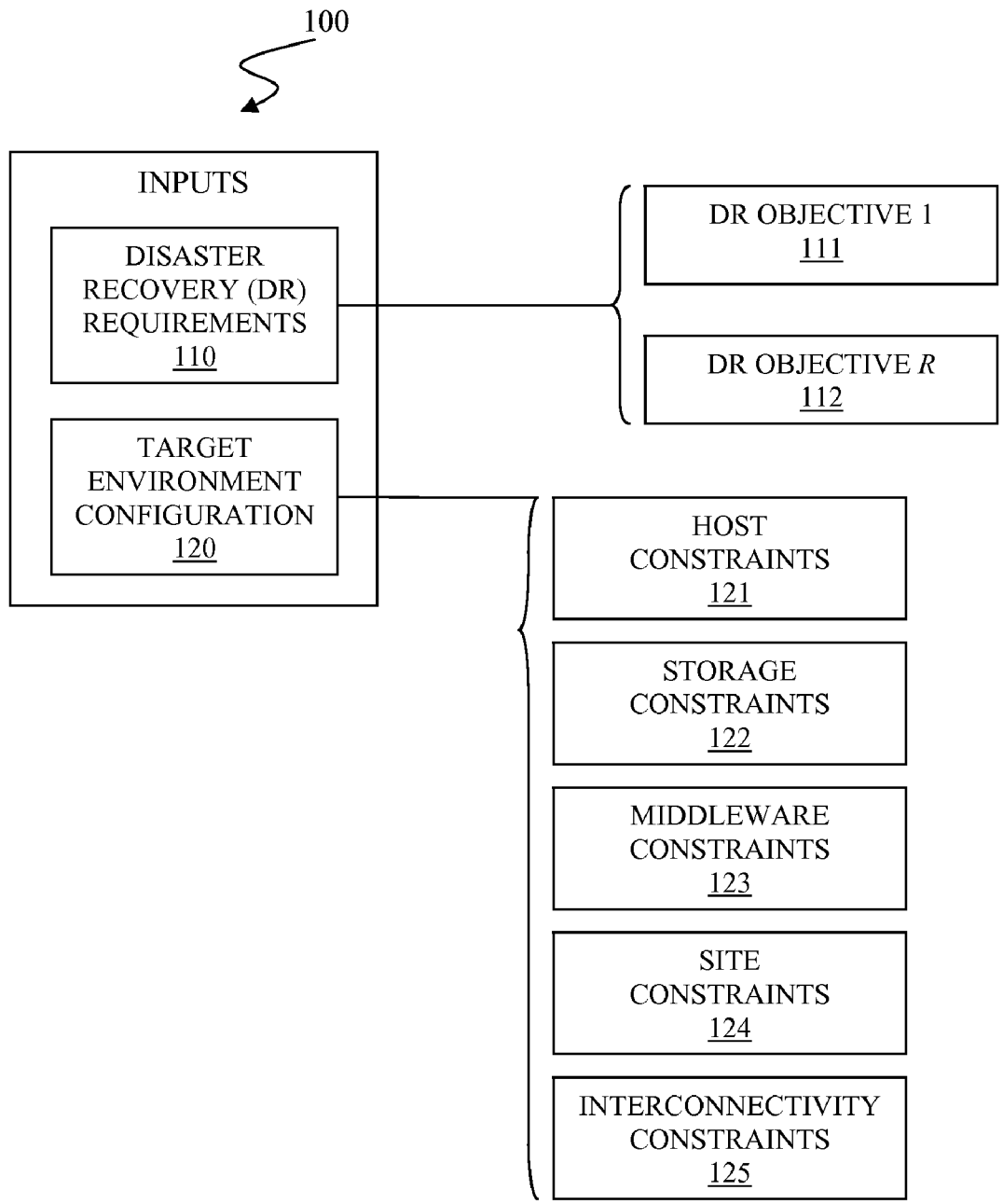
FIG. 2 illustrates the input to the DR planning process in the system for automated disaster recovery (DR) planning of FIG. 1, in accordance with the embodiments of the present invention.

FIG. 2 illustrates the input 100 to the DR planning process 200 in the system 10 for automated disaster recovery (DR) planning of FIG. 1, supra, in accordance with the embodiments of the present invention.

The user D 22 of FIG. 1, supra, is an architect of a disaster recovery (DR) plan who devises the input 100 to the DR planning process 200. The architect takes a specification comprising DR requirements, cost of the DR plan, and preferences for the DR plan that had been rendered by a customer who will deploy a DR plan for a target environment. The target environment runs an enterprise application to provide services to end-users.

The disaster recovery (DR) requirements 110 of the input 100 are a collection of risks the customer wants to mitigate by deploying a DR plan and information relevant to each risk. In this specification, terms "risk", "failure" and "disaster" are used interchangeably with one another. The DR requirements 110 is elementalized into units referred to as DREs by the DR planning process 200. See the description of FIG. 9, infra, for details of the DR Requirement Elements (DREs).

The DR requirements 110 collectively represent multiple DR objectives, 111 and 112, of the DR plan such as, inter alia, a deployment level in a virtualization stack of the target environment, which is selected from {virtual machine level, host level, file system level, database level, appliance level, storage controller level}, a performance requirement of the enterprise application, an efficiency estimation of the target environment with the DR plan, coverage capacities of the DR plan, cost of deploying the DR plan, a DR protection type, preference for the DR plan, etc. Conflicting objectives may be pursued in a single DR plan. Examples of conflicting objectives may be, inter alia, aiming for closely synchronized replicas with minimal impact to foreground processes, maintaining accessibility in the face of as many failure types as possible, using as little expensive inter-site network bandwidth as possible while robust two-site redundancy, etc. Conflicting objectives should be prioritized and coordinated by the customer and/or the architect of the DR plan in devising the DR requirements 110 for the DR planning process 200.

The target environment configuration 120 of the input 100 describes the target environment for which the DR plan is created. The target environment configuration 120 comprises multiple target environment constraints which are classified into respective constraints for a level in a virtualized infrastructure of computing resources comprising the target environment. In this specification, the virtualized infrastructure is also referred to as a virtualization stack, virtualization hierarchy, architecture, etc. The target environment configuration 120 comprises host constraints 121, storage constraints 122, middleware constraints 123, site constraints 124, and interconnectivity constraints 125.

The host constraints 121 define physical and virtual features of hosting servers that include, inter alia, a type of server hardware, specifications of the processor, memory, host bus adapter, type of Operating System (OS) with version details, virtual server details for virtual servers, etc.

The storage constraints 122 define configuration of storage devices that includes, inter alia, specification of storage controllers, a model name, performance usage statistics, available capacity, etc.

The middleware constraints 123 describe features of mid-level programs supporting functionalities of the services of the enterprise application such as, inter alia, a file system, a database, a volume manager, etc.

The site constraints 124 specify features of sites such as, inter alia, number of sites in the target environment, respective locations of each site, which is selected from {local, regional, global}, respective server-storage capacity of each site, etc.

The interconnectivity constraints 125 describe network interconnectivity and type of network, which is selected from {inter-site, intra-site}, that is used for interconnection, etc.

Figure 3:
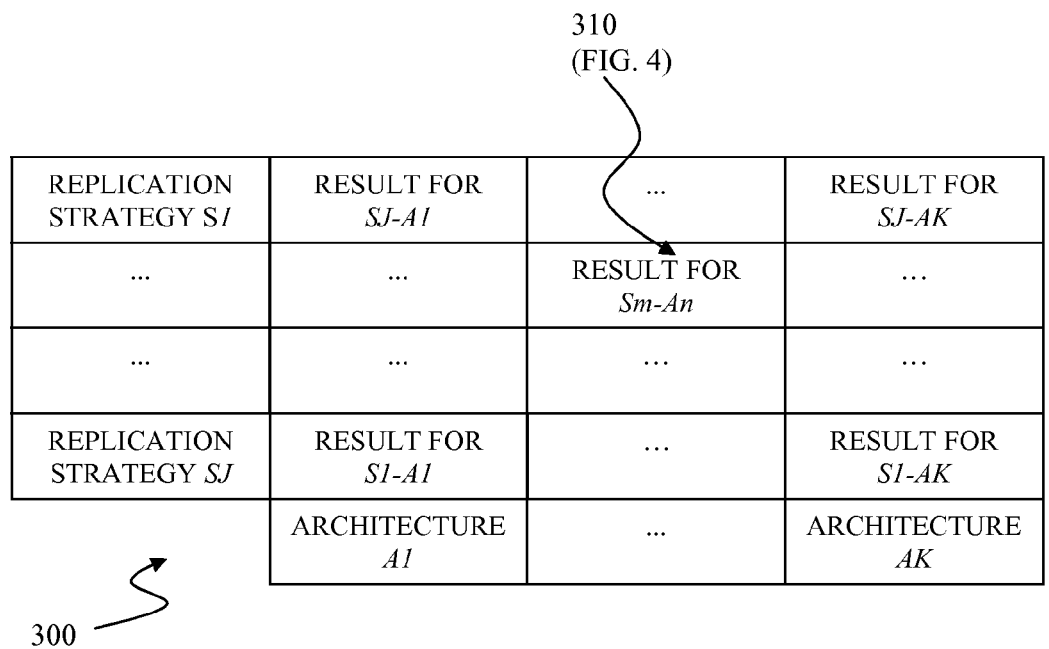
FIG. 3 illustrates the output from the DR planning process in the system for automated disaster recovery (DR) planning of FIG. 1, in accordance with the embodiments of the present invention.

FIG. 3 illustrates the output 300 from the DR planning process 200 in the system 10 for automated disaster recovery (DR) planning of FIG. 1, supra, in accordance with the embodiments of the present invention.

The output 300 presents created DR plans in the strategy-architecture grid such that the user D 22 who designs the DR plan easily recognizes highly ranked DR plans for respectively suitable deployment circumstances represented by each boxes of the strategy-architecture grid. A first dimension of the strategy-architecture grid of the output 300 is a replication strategy, which is selected from {Strategy S1 . . . Strategy Sj}, wherein there are j number of replication strategies, wherein j is a positive integer. A replication strategy determines, inter alia, how to operate replicas of server and/or storage, how often replicas should be made or updated, how to share workload between the primary and the secondary, how many replicas should be made, and where the replicas should be kept, etc. Each replication strategy may be implemented in architectures of various virtualization levels of the target environment to meet varying target environment constraints based on technical characteristics, interoperability, and trade-offs in each DR plans, etc. For example, a same replication strategy is implemented in architectures of various virtualization levels such as, inter alia, a storage controller, a virtualization appliance that intermediates a host server and a storage device, and/or a file system that creates multiple copies of files. Each implementation of the same replication strategy has different cost, performance, and risk in the same target environment pursuant to the architecture of a corresponding virtualization level in which the replication technology is implemented.

A second dimension of the strategy-architecture grid of the output 300 is an architecture, which is selected from {Architecture A1 . . . Architecture Ak}, wherein there are k number of architectures, wherein k is a positive integer. The architecture refers to an architectural level in a virtualization hierarchy, or simply a virtualization level. In this specification, the term architecture, the term architectural level, and the term virtualization level are used interchangeably.

In one embodiment of the present invention, a set of selected replication strategies is {single-site redundancy, single-site redundancy with tape backup, two-site stand-by configuration, two-site production load sharing, three-site replication}, wherein the element "single-site redundancy" indicates a strategy wherein data is replicated within a same site as a primary data, the element "single-site redundancy with tape backup" indicates a strategy wherein data is replicated within the same site as the primary data that is periodically tape-archived at a remote location, the element "two-site stand-by configuration" indicates a strategy wherein data is replicated to another sited and the replicated data will be useful only during a failover, the element "two-site production load sharing" indicates a strategy wherein an enterprise application runs on two sites to share workload such that any updates on one of two sites are propagated to the other site, and the element "three-site replication" indicates a strategy wherein data is replicated to a local site close to a primary site for efficient replication and to a remote site that is far from the primary site for robust redundancy.

In one embodiment of the present invention, a set of selected architectures is {virtual machine, host, file system, database, appliance, storage controller}, wherein each element of the set is commensurate with a respective virtualization level of the target environment.

In one embodiment of the present invention, each box in the strategy-architecture grid is colorized to visualize how highly recommended a result in the respective box is based on rating, cost effectiveness, and relevance of a DR plan comprising the result. Wherein the rating is higher, the cost is lower, and environment configurations of the DR plan is more relevant to the target environment, the DR plan is more highly ranked as more desirable. See FIG. 12A for an example of the strategy-architecture grid of the output 300.

Figure 4:
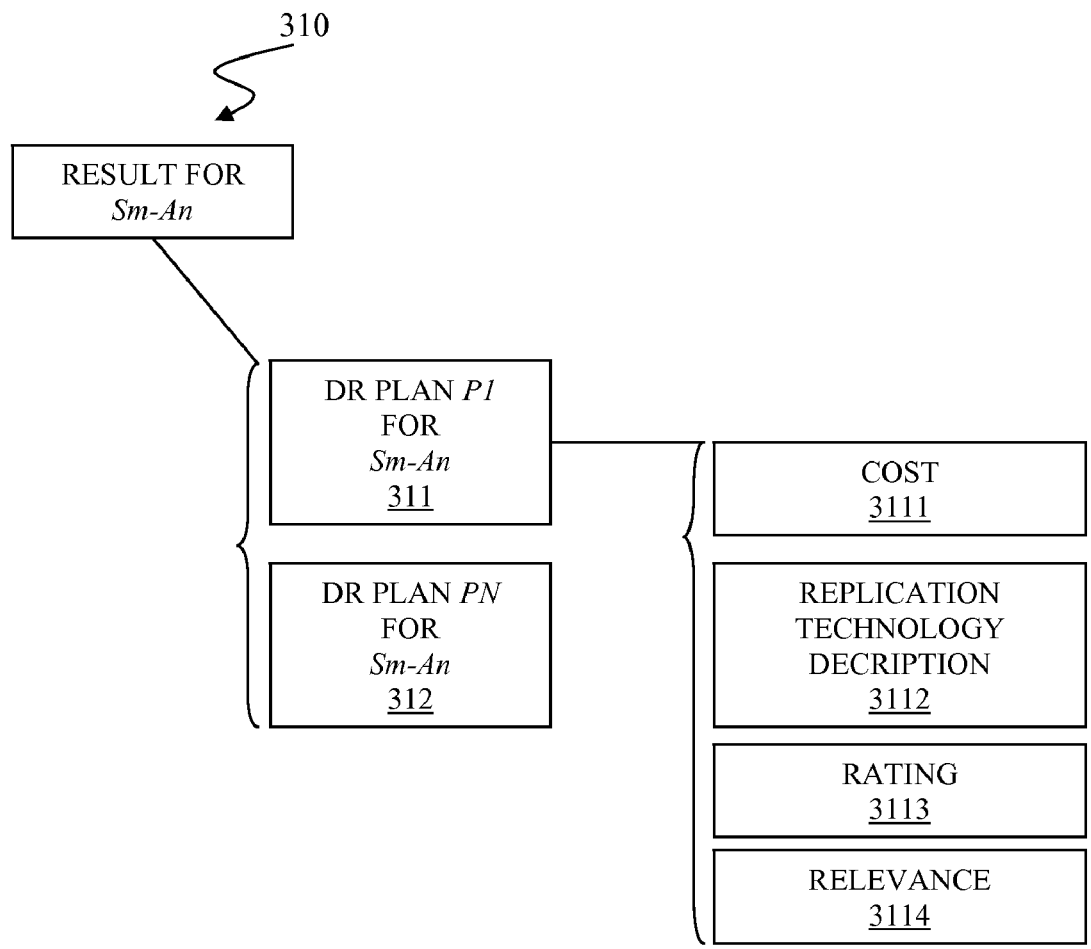
FIG. 4 illustrates a result presented within the strategy-architecture grid of FIG. 3, in accordance with the embodiments of the present invention.

FIG. 4 illustrates a result 310 presented within the strategy-architecture grid 300 of FIG. 3, supra, in accordance with the embodiments of the present invention.

The result 310 is presented in a box in the strategy-architecture grid 300 wherein the DR planning process creates at least one DR plan for a combination of strategy Sm and architecture An represented by the box. The result lists all DR plans 311, 312, created for the combination of strategy Sm and architecture An. Each DR plan, 311, 312, comprises a cost 3111, a replication technology description 3112, a rating 3113, and a relevance 3114.

The replication technology description 3112 of the DR plan 311 comprises a combination of replication technologies and related replication attributes of the combination. Examples of replication technologies may be, inter alia, point-in-time data replication, synchronous data replication, asynchronous data replication, server replication, server clustering, database replication, etc.

Figure 5:
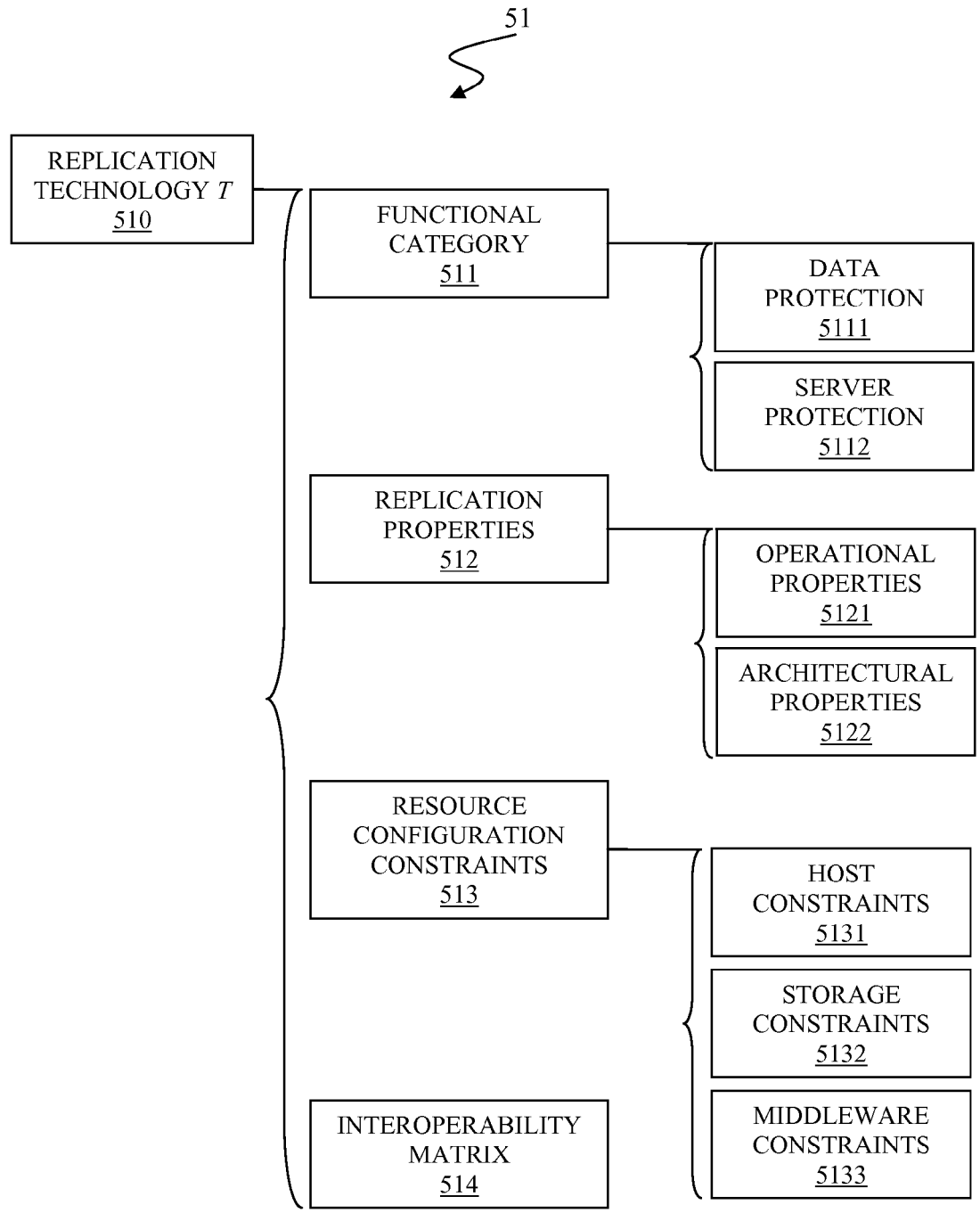
FIG. 5 illustrates the replication technology catalog of the knowledgebase of FIG. 1, in accordance with the embodiments of the present invention.

FIG. 5 illustrates the replication technology catalog 51 of the knowledgebase 50 of FIG. 1, supra, in accordance with the embodiments of the present invention.

A replication technology T 510 is an entry out of at least one entry of the replication technology catalog 51. The replication technology T 510 describes a replication technology pursuant to a canonical model template that can be utilized by the DR planning process 200. The replication technology T 510 comprises attributes of a functional category 511, replication properties 512, resource configuration constraints 513, and an interoperability matrix 514.

The functional category 511 describes a mode of protection provided by the replication technology T 510. The functional category 511 is classified to a data protection 5111 class or a service protection 5112 class.

The data protection 5111 class may have a value selected from a group of {Point-in-Time Full, Point-in-Time Incremental, Synchronous, Asynchronous}. The values of "Point-in-Time Full" and "Point-in-Time Incremental" indicate that the replication technology T 510 takes periodic snapshots of primary data volumes or files to protect. The periodic snapshots are used to recover from a data corruption such as a computer virus outbreak, an accidental overwrite caused by a misconfiguration, a corruption to software images, etc. The replication technology T 510 having "Point-in-Time Full" value for the data protection 5111 periodically makes a complete copy of the primary data. The replication technology T 510 having "Point-in-Time Incremental" value for the data protection 5111 periodically replicates updated blocks of the primary data by a memory synchronization technique known as "copy-on-write", or generates a log of updates to the primary data such that any version of the primary data that is recorded in the log can be reinstated.

The replication technology T 510 having "Synchronous" value for the data protection 5111 replicates the primary data on-line such that data updates to the primary data are completed upon updating replicas as well. Because primary data is kept synchronized with replicas all the time, "Synchronous" data replication is also referred to as continuous data replication.

The replication technology T 510 having "Asynchronous" value for the data protection 5111 periodically batches updates to the primary data and propagates batched updates to replicas.

The server protection 5112 class may have a value selected from a group of {Detect, Failover, Application restart} in an order of increased level of clustering support. The replication technology T 510 having "Detect" value for the server protection 5112 utilizes a master-slave configuration where a master server in a cluster continuously monitors whether slave servers in the cluster is operational by using a heartbeat, etc. In "Detect" server protection 5112, if a failure of a slave server is detected, the replication technology T 510 notifies an administrator of the cluster.

The replication technology T 510 having "Failover" value for the server protection 5112 automatically responds to failures upon detecting a failure by the master server configuring another server in the cluster to take over the computation of a failed server.

The replication technology T 510 having "Application restart" value for the server protection 5112 provides server protection with scripts to restart an application in case of failure.

The replication properties 512 of the replication technology T 510 comprise operational properties 5121 and architectural properties 5122 of the replication technology T 510. The operational properties 5121 of the replication technology T 510 comprise attributes of Recovery Point Objective (RPO) in minutes, Recovery Time Objective (RTO) in minutes, Latency Impact to applications categorized in {high, medium, low}, host CPU overhead in clock cycles consumed normalized for a 1.7 GHz Intel® Pentium® 4 Processor, network overhead in terms of packets per second, and storage bandwidth overhead in terms of input/output (I/O) writes per second. (Intel and Pentium are registered trademarks of Intel Corporation in the United States and/or in other countries.) The values for the host CPU overhead, network overhead, and storage bandwidth overhead of operational properties 5121 are calculated as a function of a write rate of an application that operates in the system employing the DR plan.

The architectural properties 5122 of the replication technology T 510 comprise attributes of a virtualization level of operation comprising a value selected from {host-level, middleware-level, storage-level}, an in-order value that indicates whether updates to replicas are ordered, and a data consistency level supported by the replication technology T 510 comprising a value selected from {power-level, transaction-level, application-level}.

The resource configuration constraints 513 of the replication technology T 510 represents proper resource configuration for the replication technology T 510 to operate. The resource configuration constraints 513 comprise host constraints 5131, storage constraints 5132, and middleware constraints 5133. To operate the replication technology T 510, the environment should be configured pursuant to the resource configuration constraints 513. An individual constraint is represented as a tuple of <TYPE, CID>, wherein TYPE indicates a type of constraint selected from {host constraint, storage constraint, middleware constraint}, and wherein CID is an identifier of a constraint that is used to indicate a specific configuration attributes such as a storage controller model, a firmware version, an operating system, etc.

In one embodiment of the present invention, the resource configuration constraints is MetroMirror-Peer to Peer Remote Copy (PPRC) replication technology combination that is a synchronous data replication for specific models of IBM storage controllers. In another embodiment of the present invention, the resource configuration constraints is Symmetrix Remote Data Facility (SDRF®) replication technology that is specific to EMC® storage controllers. (SDRF and EMC are registered trademarks of EMC Corporation in the United States and/or other countries.)

The interoperability matrix 514 of the replication technology T 510 comprises a list of target devices that can be employed for a combination of replication technologies when the replication technology T 510 and a primary device are provided. The interoperability matrix 514 thus represents interoperable target devices and interoperable replication technologies that can be simultaneously employed for each target device. Interoperability of the replication technology also arises due to cascading technologies employed in a sequence. The interoperability matrix 514 specifies whether a source-target relationship of different technologies is possible. The interoperability matrix 514 also specifies a number of replicas that can be associated with a given primary data.

In one embodiment of the present invention, wherein PPRC replication technology operates for a primary controller of IBM DS6000® controller, the interoperability matrix for the PPRC technology represents DS6000 mapped with {DS6000, DS8000} indicating that a target controller can be DS6000 or a DS8000®. In another embodiment, a host-level replication technology using Veritas® Volume Replicator running on a windows host, the interoperability matrix enumerates types of target storage controllers that support the replication. (DS6000 and DS8000 are registered trademarks of IBM Corporation in the United States and other countries; Veritas® is a registered trademark of Symantec Corporation or its affiliates in the U.S. and other countries.)

Figure 5A:
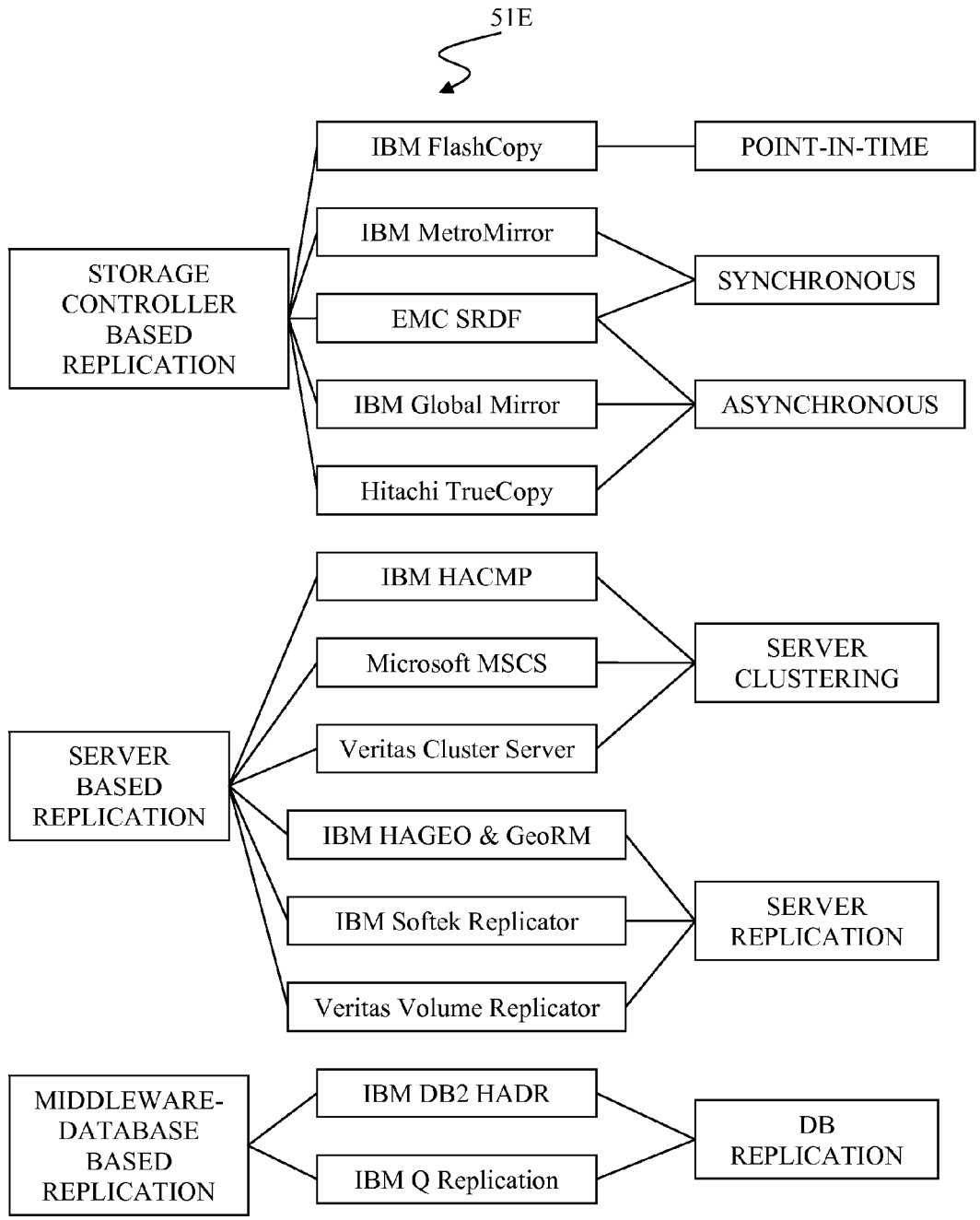
FIG. 5A illustrates an example of the replication technology catalog, in accordance with the embodiments of the present invention.

FIG. 5A illustrates an example of the replication technology catalog 51E, in accordance with the embodiments of the present invention.

The example 51E illustrates multiple commercially available replication technologies based on multiple architectural levels {storage controller based, server based, middleware based}, and respective functional categories of each respective technology {Point-in-Time, Synchronous, Asynchronous, Server Clustering, Server Replication, DB replication}.

Figure 6:
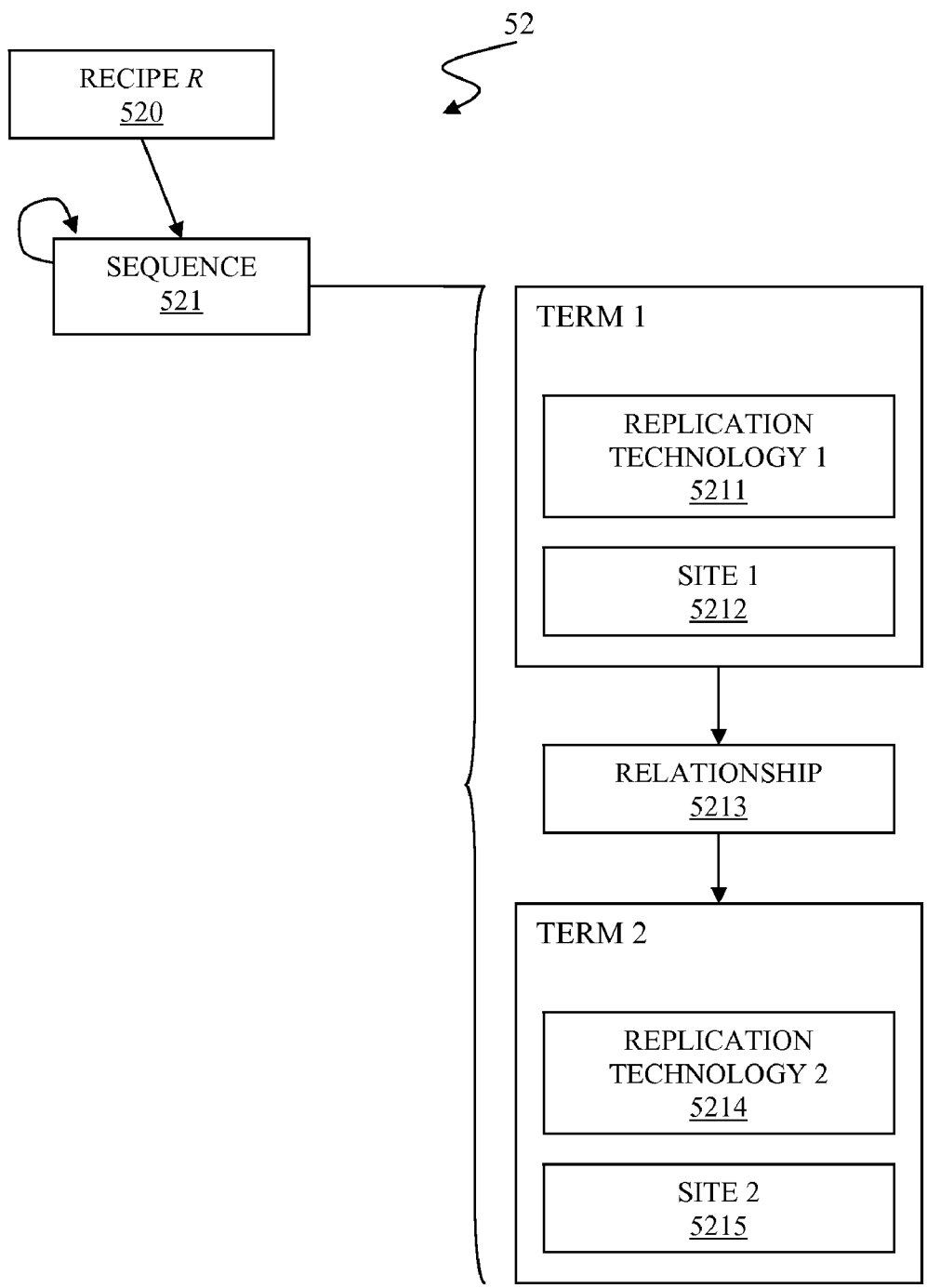
FIG. 6 illustrates the best practice recipe of the knowledgebase of FIG. 1, in accordance with the embodiments of the present invention.

FIG. 6 illustrates a recipe in the best practice recipe repository 52 of the knowledgebase 50 of FIG. 1, supra, in accordance with the embodiments of the present invention.

The best practice recipe (BPR) repository 52 comprises an inclusion list and an exclusion list, respectively comprising a recipe. The recipe is a collection of replication technologies with sequential relationships among replication technologies. The inclusion list enumerates recommended recipes. A recipe in the inclusion list is a combination of replication technologies that are effective for the corresponding environment configuration. The inclusion list is applied when generating permutation of replication technologies for a DR plan, or selecting a new recipe from generated permutations for a given DR requirements. The recipes in the inclusion list are recommended based on multiple user feedbacks cumulated from field practices and/or interoperability tests. The exclusion list enumerates a combination of replication technologies that should be avoided for the corresponding environment configuration due to frequently reported errors.

In one embodiment of the present invention, each BPR in respective lists is represented in a schema comprising at least one sequence as follows:

Recipe=One or more [Sequence]
Sequence=[Technology] [Site] [Relationship] [Technology] [Site]
Site=Target Site Number
Relationship=[Serial|Parallel]

Figure 6A:
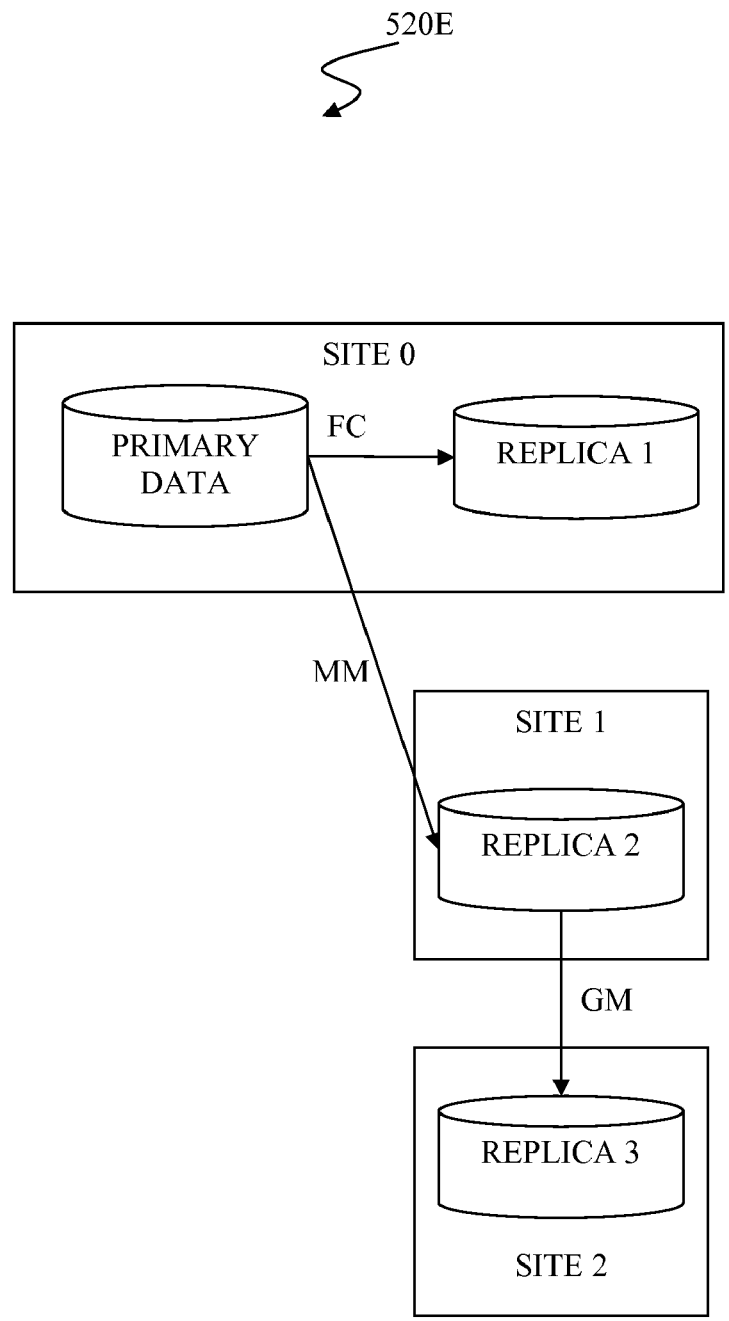
FIG. 6A illustrates an example of a recipe, in accordance with the embodiments of the present invention.

FIG. 6A illustrates an example of a recipe 520E, in accordance with the embodiments of the present invention.

The example recipe 520E represents two sequences SEQ [0] and SEQ [1] for three-site environment as follow:
SEQ [0]=IBM FlashCopy FC (Site 0) ∥ IBM Metro Mirror MM (Site 1)
SEQ [1]=IBM Metro Mirror MM (Site 1)->IBM Global Mirror GM (Site 2)

See arrows labeled FC and MM in FIG. 6A for a first sequence SEQ [0]. In SEQ [0], two replicas REPLICA 1 and REPLICA 2 are made concurrently as indicated by the parallel relationship notated as "∥". A first replication technology IBM FlashCopy FC makes REPLICA 1 at a local site Site 0 in which a primary data is located. A second replication technology IBM Metro Mirror MM makes REPLICA 2 at another site Site 1 that is remote to the primary data at Site 0.

See arrows labeled MM and GM in FIG. 6A for a second sequence SEQ [1]. In SEQ [1], two replicas REPLICA 2 and REPLICA 3 are made in a serial order as indicated by the serial relationship notated as "->". After the second replication technology IBM Metro Mirror MM makes REPLICA 2 at site 1, a third replication technology IBM Global Mirror GM makes REPLICA 3 at a second remote site Site 2.

Figure 7:
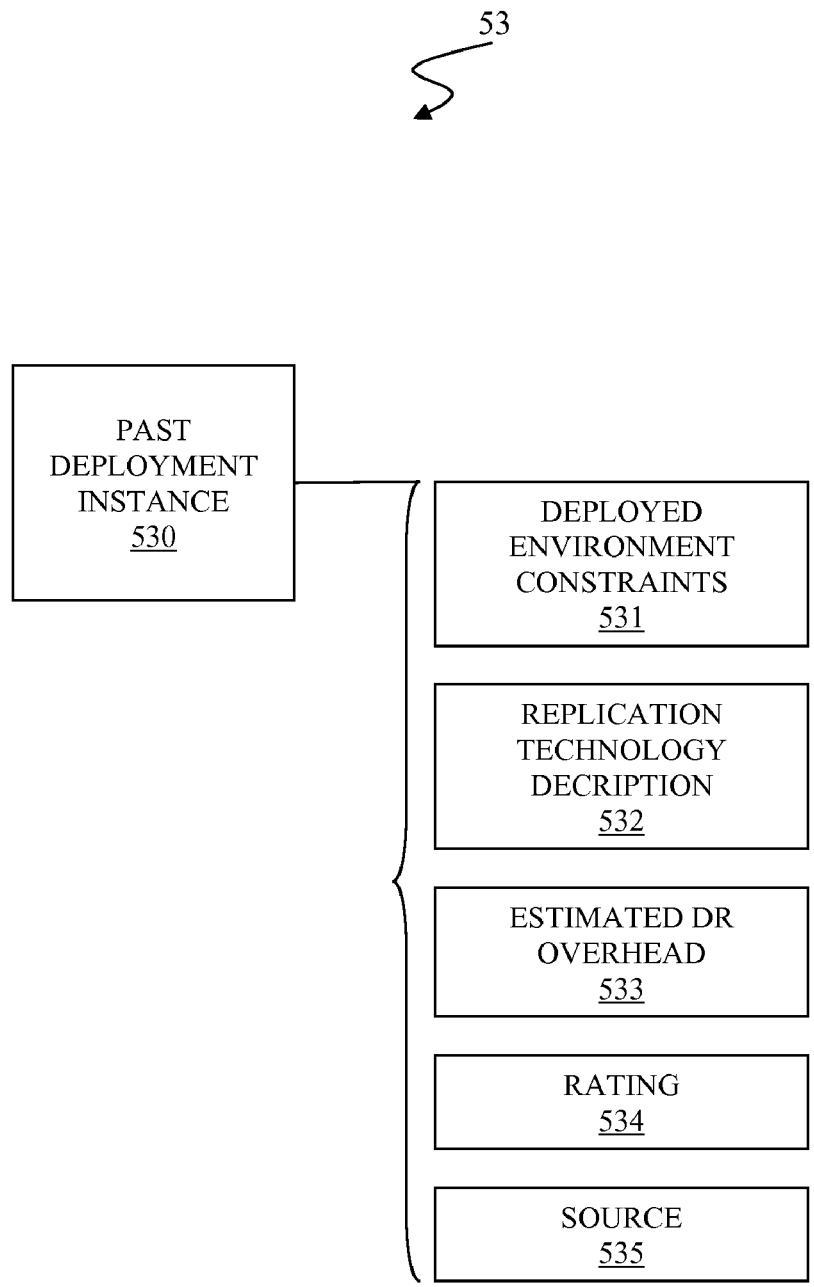
FIG. 7 illustrates a past deployment instance of the past deployment record stored in the knowledgebase, in accordance with the embodiments of the present invention.

FIG. 7 illustrates a past deployment instance 530 of the past deployment record 53 stored in the knowledgebase 50, in accordance with the embodiments of the present invention.

The past deployment instance 530 comprises an environment 531, a replication technology description 532, an estimated DR overhead 533, a rating 534, and a source 535.

The deployed environment constraints 531 describe a computing environment in which the past deployment instance 530 had been deployed. The deployed environment constraints 531 are described in parameters comparable to the target environment constraints of FIG. 2, supra, and/or the resource configuration constraints 513 of FIG. 5, supra.

The replication technology description 532 defines how replication technologies are combined in the past deployment instance 530. The replication technologies are combined in parallel or in serial. See the description of a sequence in FIG. 6, supra, for a parallel/serial combination of replication technologies.

The estimated DR overhead 533 is an expected cost of deploying the past deployment instance 530, which represents replication properties of the DR plan of the past deployment instance. The estimated DR overhead 533 is represented in parameters comparable to operational properties of the replication technology catalog.

The rating 534 is user evaluation information comprising user preference and a frequency of deployment of the past deployment instance 530. The source 535 describes an origin of the past deployment instance 530, which enables to identify by whom the past deployment instance was developed.

DR plans developed in the past are reused in DR planning of the present invention by storing them as instances of the past deployment history 53. DR plans need to be customized to suit a specific customer environment and to meet application DR requirements for failure types and the corresponding RPO, RTO, application latency upper-bounds. Thus, conventional DR planning involves multiple steps performed by human DR experts, and consequently, is very time-consuming and expensive. The past deployment history 53 makes DR solutions developed in the past reusable. The DR planning process utilized the past deployment instances as well as the best practice recipes to create a DR plan. The past deployment instance 530 is selected if the deployed environment constraints 531 are similar to the target environment constraints for which the DR plan is created. The proximity of an environment of the past deployment instance to the target environment of a DR plan is represented as the relevance 3114 of the DR plan as described in FIG. 4, supra.

Figure 8:
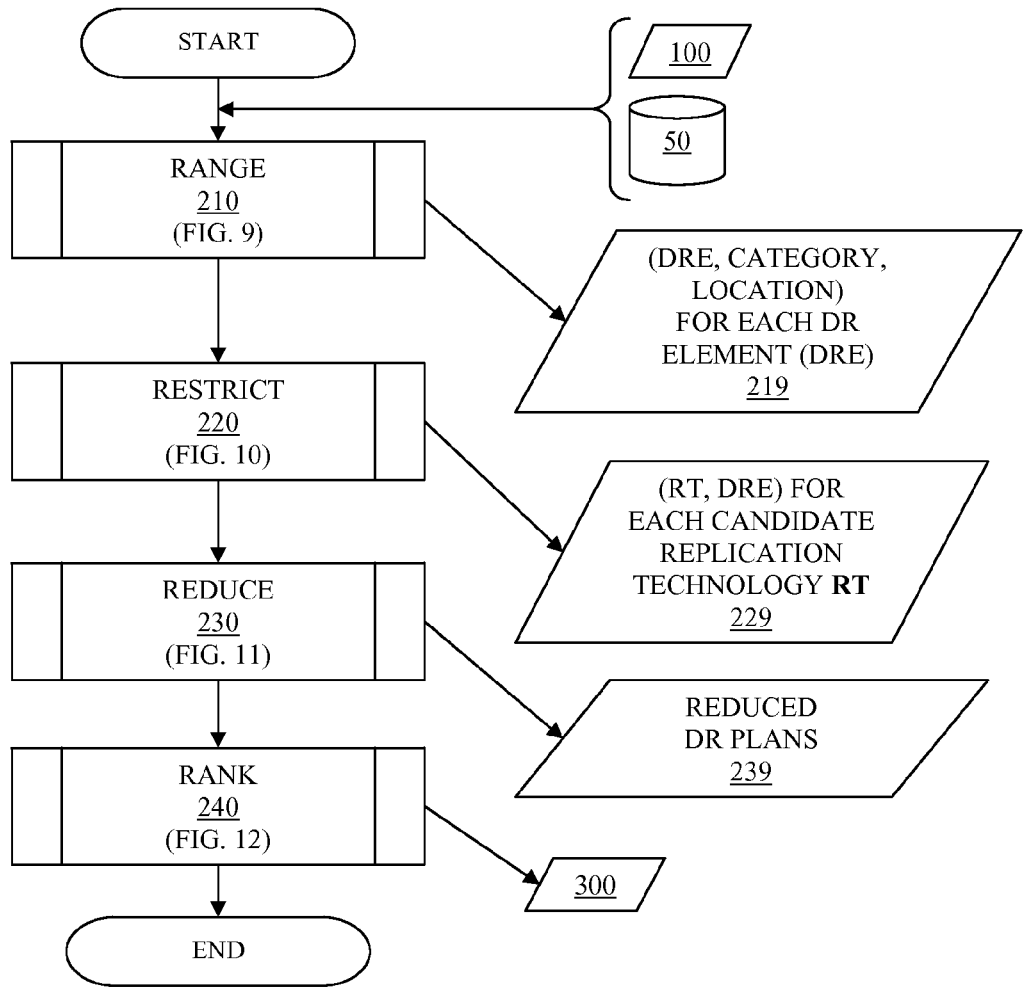
FIG. 8 is a flowchart depicting a method for disaster recovery (DR) planning process referred to as R4 process, in accordance with the embodiments of the present invention.

FIG. 8 is a flowchart depicting a method for disaster recovery (DR) planning process referred to as R4 process, in accordance with the embodiments of the present invention.

In step 210, the DR planning process performs a "RANGE" subprocess over the inputs 100 of FIG. 1, supra, comprising the DR requirements and the target environment constraints and produces mappings 219 for DR Requirement Elements to respective functional category classification and location for each DRE in the DR requirements. See the description of FIG. 9, infra, for details of the RANGE subprocess.

In step 220, the DR planning process performs a "RESTRICT" subprocess over the target environment constraints and the replication technology catalog 51 of the knowledgebase 50 in FIG. 1, supra, and produces mappings 229 for selected replication technologies associated with a respective DR Requirement Element (DRE). In a mapping, the selected replication technology is eligible in a DR plan to address the associated DRE. See the description of FIG. 10, infra, for details of the RESTRICT subprocess.

In step 230, the DR planning process performs a "REDUCE" subprocess to generate DR plans 239 for the target environment. The REDUCE subprocess utilizes data produced in steps 210 and 220 as well as the best practice recipe (BPR) repository 52 and the deployment record 53 of the knowledgebase 50 in FIG. 1, supra. See the description of FIG. 11, infra, for details of the REDUCE subprocess.

In step 240, the DR planning process performs a "RANK" subprocess to generate the outputs 300 of FIG. 3, supra. The RANK subprocess utilizes data produced in steps 210, 220 and 230 as well as the replication technology catalog 51 and the deployment record 53 of the knowledgebase 50 in FIG. 1, supra. See the description of FIG. 12, infra, for details of the RANK subprocess.

Figure 9:
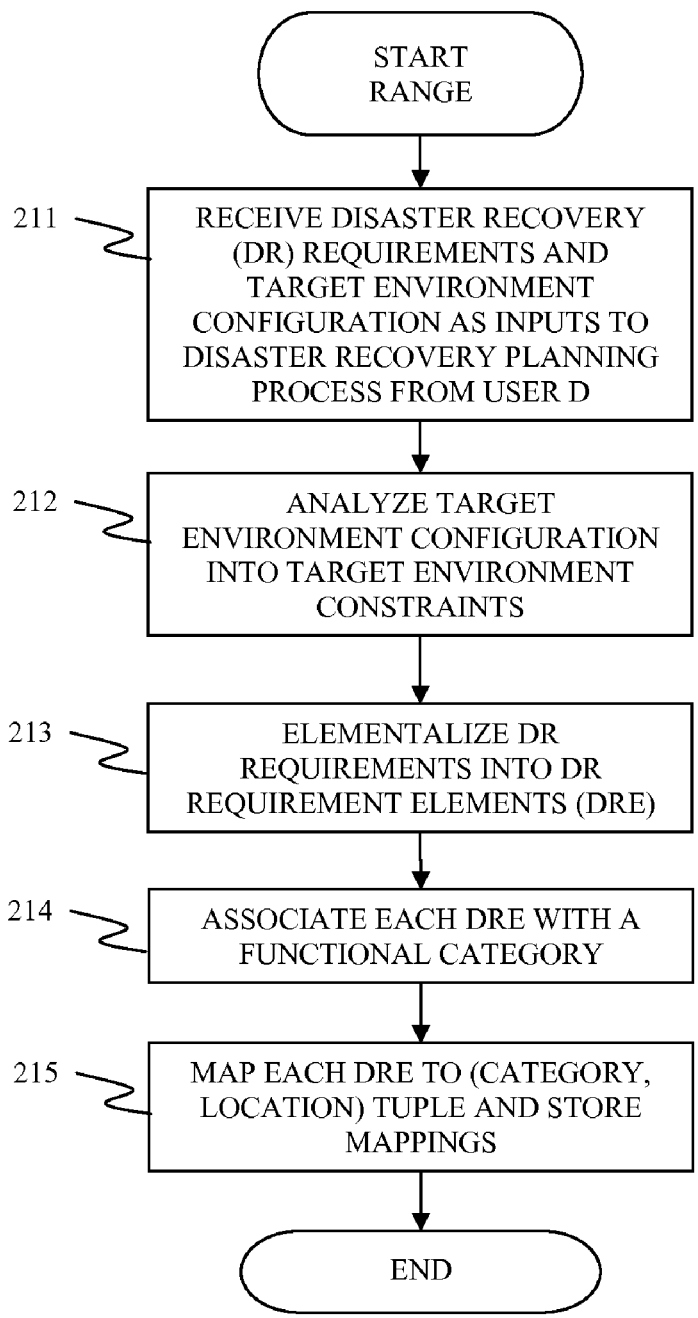
FIG. 9 is a flowchart depicting a method for the RANGE subprocess of the DR planning process of FIG. 8, supra, in accordance with the embodiments of the present invention.

FIG. 9 is a flowchart depicting a method for the RANGE subprocess of the DR planning process of FIG. 8, supra, in accordance with the embodiments of the present invention.

In step 211, the RANGE subprocess receives the DR requirements and the target environment configuration as inputs to DR planning process from the user D of FIG. 1, supra.

In step 212, the RANGE subprocess analyzes the target environment configuration into the target environment constraints as described in FIG. 2, supra.

In step 213, the RANGE subprocess elementalizes DR requirements into at least one DR Requirement Element (DRE). Each DRE defines a unit of failure protection that is required to be protected by the DR plan. Thus, each DRE is a DR planning element. Each DRE comprises a respective risk, a respective impact that quantifies a respective estimated monetary loss caused by the respective risk, respective replication properties comprising Recovery Point Objective (RPO), Recovery Time Objective (RTO), Latency Impact, Data Consistency Requirement, etc.

The risk of the DRE may be classified for simplification into broad types of risks that are regarded as identical in terms of DR planning perspectives. Such types of risks may be, inter alia, {Misconfiguration, Data corruption, Subsystem failure, Site failure, Server failover},{Data corruption, Subsystem failure, Site failure}, etc., depending on the granularity of classification required for the DR planning.

The RPO and RTO are typically determined by estimated business impact caused by the risk of the DRE. The Latency Impact is specified based on a threshold time limit for a response in I/O operations of an application, after which the application regards the I/O operations had failed. The Data Consistency Requirement of the DRE is explicitly specified by the administrator based on the type of the application.

In step 214, the RANGE subprocess associates each DRE with a respective functional category that describes a mode of protection to be provided for the DRE. Functional categories are, inter alia, data replication by Point-in-Time, Synchronous data replication, Asynchronous data replication, Server clustering, Server replication, etc. See the description of the functional category in FIG. 5, supra, for details. The functional category associated with each DRE indicates a scope of functional semantics for how data is replicated and how the servers are clustered together to protect a particular DRE with the DR plan. The functional category is utilized to select a proper replication technology for the respective DRE during the RESTRICT subprocess of the DR planning process.

In step 215, the RANGE subprocess maps each DRE to a tuple of (CATEGORY, LOCATION), wherein CATEGORY indicates the functional category associated with the DRE in step 214, and LOCATION indicates a site location in which a replica is made for a data protection functional categories for the DRE that has been acquired in step 212 from the target environment constraints. The LOCATION is either implicated based on a value of CATEGORY or explicitly provided by the user as part of the DR requirement.

The mappings are stored and utilized by the rest of subprocesses of the DR planning process. A value for LOCATION may be selected from {local, regional, remote} or a combination thereof After performing step 215, the RANGE subprocess terminates and the DR planning process proceeds with the RESTRICT subprocess.

Figure 9A:
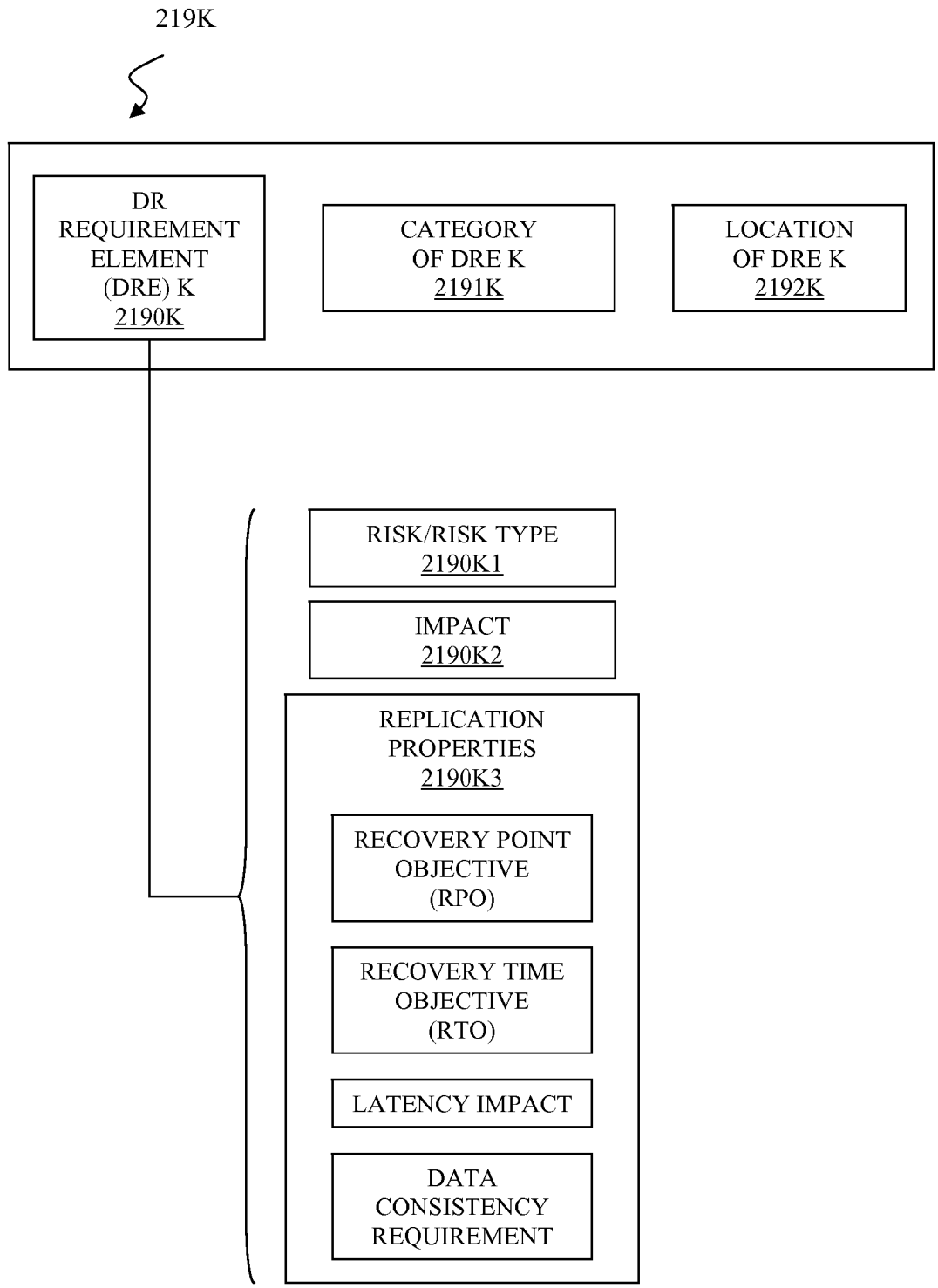
FIG. 9A illustrates an example of a map for a DRE K that the RANGE subprocess has created in step 215, in accordance with the embodiments of the present invention.

FIG. 9A illustrates an example of a map for a DRE K 219K that the RANGE subprocess has created in step 215, in accordance with the embodiments of the present invention.

The map for the DRE E 219K comprises the DR Requirement Element (DRE) K 2190K representing one elementalized risk as created in step 213, CATEGORY 2191K representing a functional category of the DRE K 2190K, and LOCATION 2192K representing a site of the DRE K 2190K.

The DRE K 2190K comprises a risk/risk type of the DRE K 2190K1, an impact value of the DRE K 2190K2, and replication properties of the DRE K 2190K3. The replication properties of the DRE K 2190K3 comprises a Recovery Point Objective (RPO) value, a Recovery Time Objective (RTO) value, a Latency Impact value, and a Data Consistency Requirement value, as described in step 213 supra.

Figure 10:
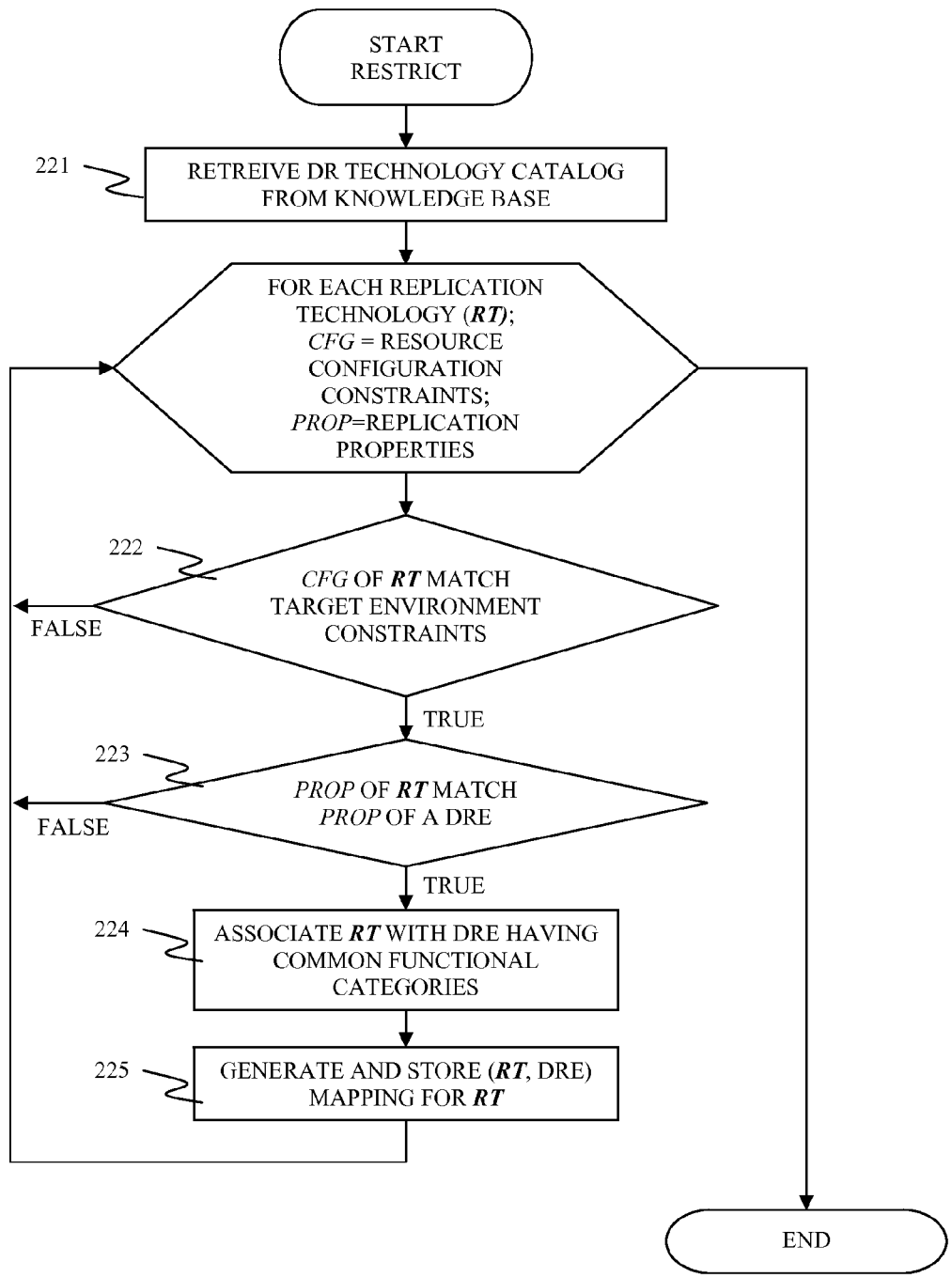
FIG. 10 is a flowchart depicting a method for the RESTRICT subprocess of the DR planning process of FIG. 8, in accordance with the embodiments of the present invention.

FIG. 10 is a flowchart depicting a method for the RESTRICT subprocess of the DR planning process of FIG. 8, supra, in accordance with the embodiments of the present invention.

In step 221, the RESTRICT subprocess retrieves the replication technology catalog from the knowledgebase. See description of FIG. 5, supra, for attributes of each replication technology. Steps 222 to 225 are performed for each replication technology retrieved from the replication technology catalog. After performing steps 222 to 225 to all retrieved replication technologies, the RESTRICT subprocess terminates and the DR planning process proceeds with the REDUCE subprocess.

In steps 222 and 223, the RESTRICT subprocess selects candidate replication technologies for the DR plan from the retrieved replication technologies by examining each replication technology.

In step 222, the RESTRICT subprocess determines whether a replication technology has resource configuration constraints matching the target environment constraints. The host constraints, the storage constraints, and the middleware constraints of the replication technology are compared with respective components of the target environment constraints. If the RESTRICT subprocess determines that the replication technology has resource configuration constraints matching the target environment constraints, then the RESTRICT subprocess proceeds with step 223 because the replication technology is deployable in the target environment in terms of both hardware and software with compatible device models, servers, operating systems and device drivers. If the RESTRICT subprocess determines that the replication technology does not have resource configuration constraints matching the target environment constraints, then the RESTRICT subprocess loops back to step 222 to examine another replication technology.

In step 223, the RESTRICT subprocess determines whether the replication technology from step 222 has replication properties matching the replication properties presented in the DR objectives. If the RESTRICT subprocess determines that the replication technology from step 222 has replication properties matching the replication properties presented in the DR objectives, then the RESTRICT subprocess proceeds with step 224. If the RESTRICT subprocess determines that the replication technology from step 222 does not have replication properties matching the replication properties presented in the DR objectives, then the RESTRICT subprocess loops back to step 222 to examine another replication technology.

In step 224, the RESTRICT subprocess associates the replication technology with a DRE that has a same functional category as the replication technology. Because the replication technology in step 224 is operable in the target environment and qualified for required replication properties, the replication technology is eligible for the DR plan, and consequently also referred to as a candidate replication technology.

In step 225, the RESTRICT subprocess generates and stores a mapping for the candidate replication technology to the associated DRE from step 224. The RESTRICT subprocess loops back to step 22 to examiner another replication technology.

Figure 11:
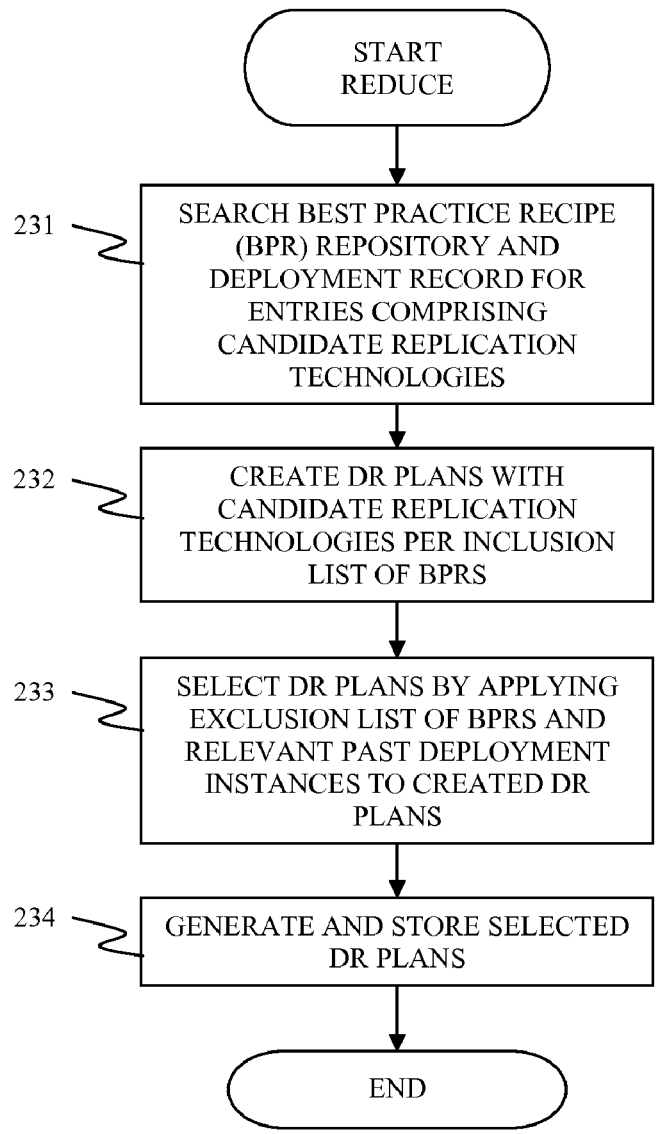
FIG. 11 is a flowchart depicting a method for the REDUCE subprocess of the DR planning process of FIG. 8, in accordance with the embodiments of the present invention.

FIG. 11 is a flowchart depicting a method for the REDUCE subprocess of the DR planning process of FIG. 8, supra, in accordance with the embodiments of the present invention.

In step 231, the REDUCE subprocess searches the best practice recipe (BPR) repository and the deployment record for respective entries comprising the candidate replication technologies from the RESTRICT subprocess. Step 231 identifies BPRs and past deployment instances comprising candidate replication technologies. In one embodiment of the present invention, searched of the knowledgebase in step 231 are formulated as a Backtracking problem for efficiency.

In step 232, the REDUCE subprocess creates DR plans with candidate replication technologies based on rules presented in an inclusion list of the BPRs from step 231. To create DR plans, candidate replication technologies are serially or parallelly joined together, according to relationships defined in the BPRs. If the relationship is "serial", two candidate replication technologies are applicable one after another. If the relationship is "parallel", two candidate replication technologies are simultaneously applicable.

A candidate replication technology is selected for a DRE. Although a (m×n) number of permutations of candidate replication technologies can be made wherein m is the number of DREs and n is the number of replication technologies, due to interoperability and target environment constraints and due to the fact that multiple DREs can be addressed by one replication technology, the number of combination/permutation is less than mathematical upper bound.

In step 233, the REDUCE subprocess selects DR plans by applying an exclusion list of the BRPs and relevant past deployment instances to DR plans created in step 232.

In step 234, the REDUCE subprocess generates and stores selected DR plans. The generated DR plans may be, inter alia, a combination of multiple technologies in a serial/parallel fashion, a single replication technology that meets all replication properties of DR objectives, a past deployment instance applicable to the target environment, a best practice recipe operable in the target environment, etc.

After performing step 234, the REDUCE subprocess terminates and the DR planning process proceeds with the RANK subprocess.

Figure 12:
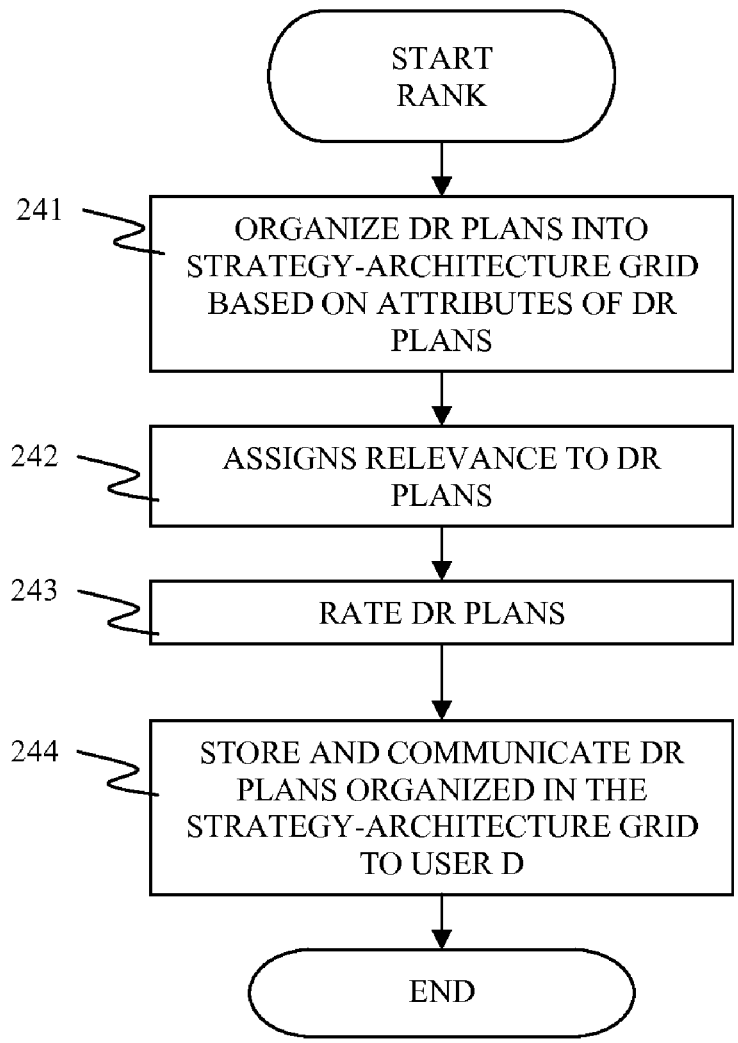
FIG. 12 is a flowchart depicting a method for the RANK subprocess of the DR planning process of FIG. 8, in accordance with the embodiments of the present invention.

FIG. 12 is a flowchart depicting a method for the RANK subprocess of the DR planning process of FIG. 8, supra, in accordance with the embodiments of the present invention.

In step 241, the RANK subprocess organizes DR plans from the REDUCE subprocess into a strategy-architecture grid based on attributes of the DR plans. See FIG. 12A for an example of the strategy-architecture grid. See descriptions of FIG. 3, supra, for details of the strategy-architecture grid.

In step 242, the RANK subprocess assigns relevance to the DR plans in the strategy-architecture grid, based on the proximity of environment configuration constraints of the DR plan to the target environment constraints. Because past deployment instances and/or best practice recipes have fixed environment configuration constraints, a DR plan acquired from these entries of the knowledgebase may not be customized for the target environment constraints. In one embodiment of the present invention, the relevance has a value in a range from 0 to 100, inclusive, that represents a weighted sum of items measuring the proximity of the environment constraints. The respective weight for each environment constraints is tuned and/or preconfigured per different replication technologies.

In step 243, the RANK subprocess rates DR plans based on various data, inter alia, the rating of a past deployment instance from users, DR consultant feedbacks, specific actions taken by administrators of IT environments such as selecting the DR plan or discarding the DR plan, explicit specification provided by a designer of the DR plan, etc. All components of DR plans such as a replication technology, best practice recipes, past deployment instances, etc., can be separately rated.

In one embodiment of the present invention, the rating is a value in a range from 1 to 5, inclusive, that represents a weighted average of all rating values for the DR plan and components of the DR plan, wherein each rating value is weighted by a respective person providing the rating value. For example, if the target environment runs an application with frequent write operations, a first replication technology implementing synchronous data protection is rated low because the first replication technology will incur greater overhead on network/data communication bandwidth utilization and application latency impact, and consequently degrade overall performance of the target IT environment. On the other hand, a second replication technology implementing asynchronous data protection is rated high for long-distance remote replications with the same application with frequent write operations.

In step 244, the RANK subprocess stores and communicates the DR plans organized in the strategy-architecture grid to the user D. See descriptions of FIGS. 3 and 4, supra, for details of the strategy-architecture grid and components of respective DR plans. Each DR plan comprises cost of the DR plan, detailed descriptions on replication technologies employed in the DR plan, rating and relevance. The strategy-architecture grid enables the user D to select each cell of the grid and to review DR plans listed in each cell.

Figure 12A:
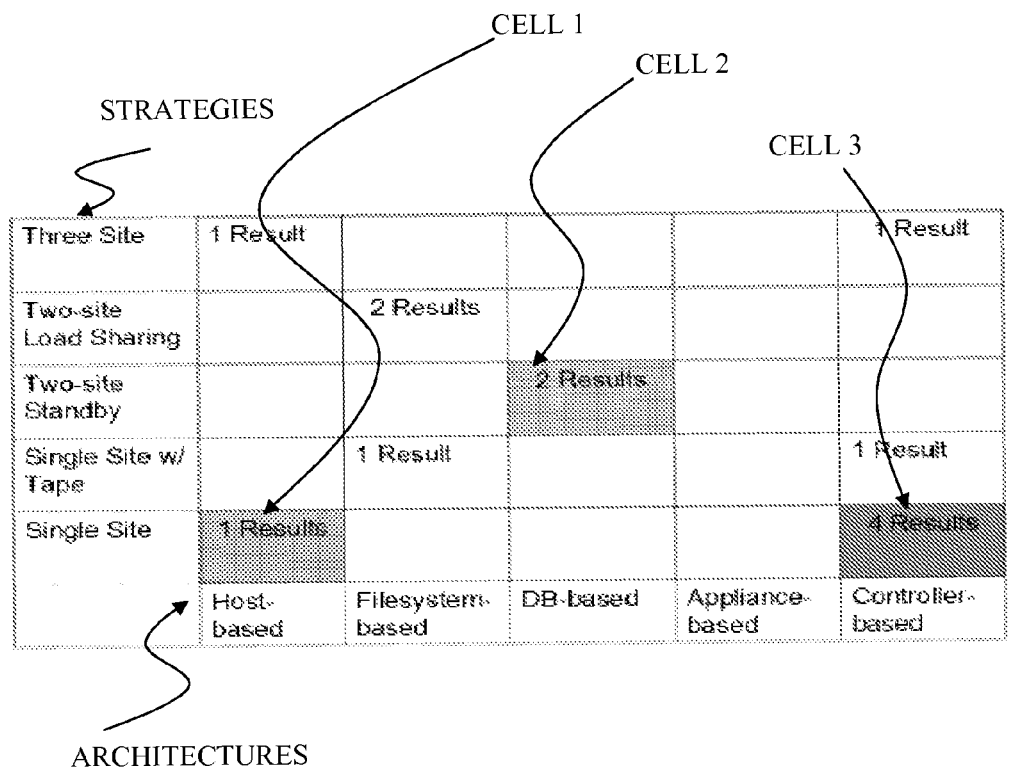
FIG. 12A illustrates a strategy-architecture grid for disaster recovery (DR) plans, in accordance with the embodiments of the present invention.

FIG. 12A illustrates a strategy-architecture grid for disaster recovery (DR) plans, in accordance with the embodiments of the present invention.

A bottom row labeled ARCHITECTURES lists architectures in a virtualization stack for DR plans. A leftmost column labeled STRATEGIES lists all replication strategies employed in generating the DR plans. Each cell in the grid links a respective set of DR plans generated for a pair of a strategy and an architecture represented by each cell. A cell may be filled with a distinctive color wherein the respective set of DR plans in the cell is highly rated by the RANK subprocess in step 243. CELL 1, CELL 2, and CELL 3 are associated with one of top-ranked DR plan, respectively.

Figure 13:
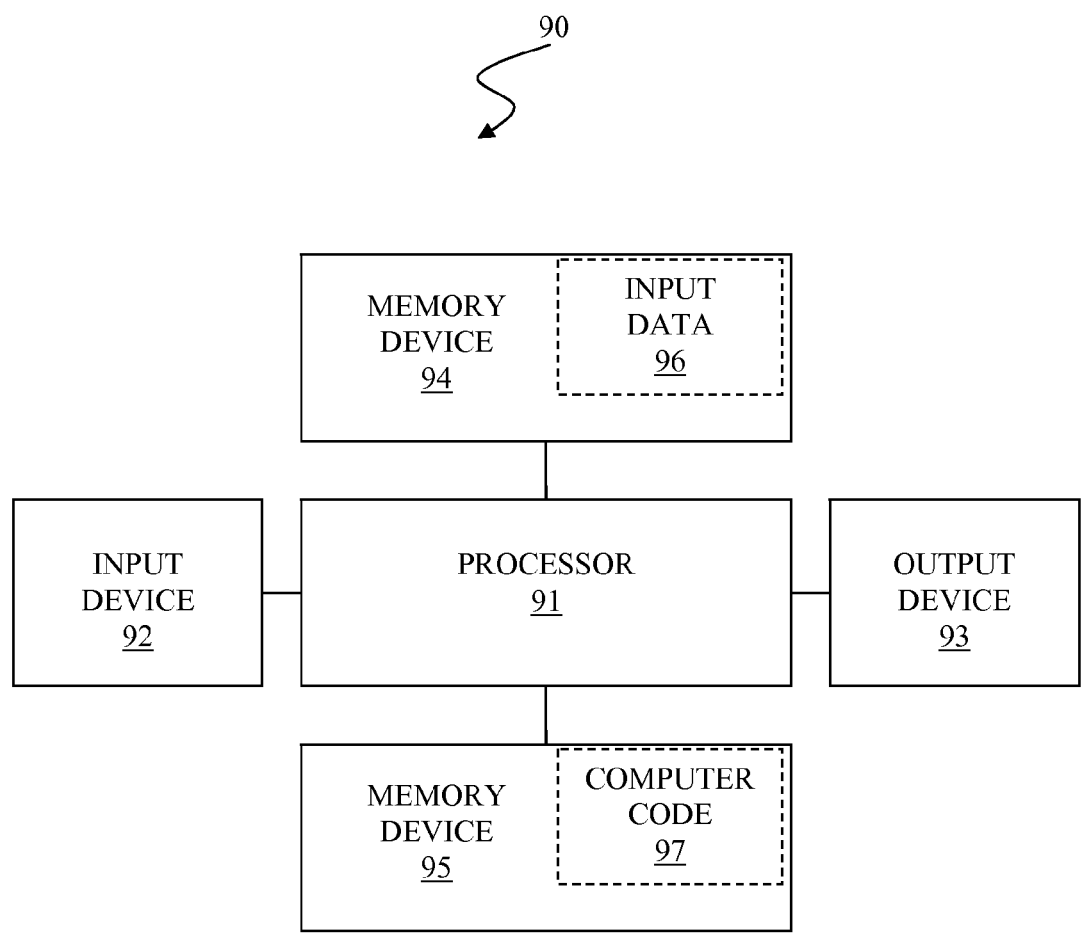
FIG. 13 illustrates a computer system used for automated disaster recovery (DR) planning, in accordance with embodiments of the present invention.

FIG. 13 illustrates a computer system 90 used for automated disaster recovery (DR) planning, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program code that comprises computer-executable instructions. The computer code 97 includes, inter alia, an algorithm used for automated disaster recovery (DR) planning according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer readable storage medium (or a computer usable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer readable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for automated disaster recovery (DR) planning.

In another embodiment, the invention provides a business method that performs the process steps of the invention on a subscription, advertising and/or fee basis. That is, a service provider, such as a Solution Integrator, can offer to create, maintain, support, etc. a process for determining web analytics information of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with an instruction execution system, apparatus, or device.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automated disaster recovery (DR) planning, said method comprising:

receiving disaster recovery requirements and a target environment configuration from a user, wherein the target environment configuration defines a target computing environment in which at least one disaster recovery (DR) plan is to be deployed, and wherein the disaster recovery requirements defines objectives of said at least one DR plan;

a processor of a computer system ranging the disaster recovery requirements in at least one element, wherein each element of said at least one element is a unit risk in the target computing environment to protect with said at least one DR plan, wherein said each element comprises replication properties that are required to prevent said each element;

restricting candidate replication technologies for said each element from replication technologies stored in a knowledgebase coupled to the computer system, wherein a resource configuration of the candidate replication technologies match the target environment configuration, and wherein replication properties of the candidate replication technologies match replication properties of said each element;

generating said at least one DR plan with candidate replication technologies for all elements based on best practice recipes and past deployment instances stored in the knowledgebase; and presenting, to the user, an output comprising said at least one DR plan from said generating.

2. The method of claim 1, said ranging comprising:

dissecting the target computing environment into target environment constraints, wherein the target environment constraints comprise host constraints, storage constraints, middleware constraints, site constraints, and interconnectivity constraints;

anatomizing the disaster recovery requirements into said at least one element, wherein said replication properties of said at least one element comprise a recovery point objective (RPO) and a recovery time objective (RTO); and associating each element of said at least one element with a respective functional category and a respective location, wherein the respective functional category describes a mode of protection to meet said replication properties of said each element, and wherein the respective location describes a site of said each element that meets target environment constraints applicable to said each element.

3. The method of claim 1, said generating comprising:

retrieving, from the knowledgebase, the best practice recipes and the past deployment instances, wherein the best practice recipes and the past deployment instances comprise said candidate replication technologies;

creating candidate disaster recovery (DR) plans by combining said candidate replication technologies according to sequences in an inclusion list of the best practice recipes; and selecting said at least one DR plan from created candidate DR plans by applying an exclusion list of the best practice recipe and the past deployment instances, wherein the exclusion list comprises sequences of replication technologies that should be avoided, wherein the past deployment instances specifies a respective deployed computing environment that is compatible with the target computing environment.

4. The method of claim 3, further comprising:

receiving feedbacks on the output from the user, wherein said feedbacks comprise a rating for each disaster recovery (DR) plan of said at least one DR plan; and updating the knowledgebase with respective ratings of the retrieved past deployment instances according to said feedbacks, wherein each past deployment instance of said past deployment instances comprises a rating, and wherein the rating comprises a user preference and a frequency of deployment of said each past deployment instance.

5. The method of claim 1, wherein the output classifies said at least one disaster recovery (DR) plan based on a replication strategy and an architectural level of each DR plan of said at least one DR plan, wherein said each DR plan comprises a replication technology description, a cost, a rating, and a relevance, wherein the replication technology description describes replication technologies employed in said each DR plan, wherein the cost represents the cost of deploying said each DR plan, wherein the rating quantifies utilities of said each DR plan based on human evaluations, and wherein the relevance represents a proximity of a computing environment of said each DR plan to the target computing environment.

6. A computer program product comprising:

a computer readable storage medium having a computer readable program code embodied therein, said computer readable program code containing instructions that perform automated disaster recovery (DR) planning comprising:

receiving disaster recovery requirements and a target environment configuration from a user, wherein the target environment configuration defines a target computing environment in which at least one disaster recovery (DR) plan is to be deployed, and wherein the disaster recovery requirements defines objectives of said at least one DR plan;

a processor of a computer system ranging the disaster recovery requirements in at least one element, wherein each element of said at least one element is a unit risk in the target computing environment to protect with said at least one DR plan, wherein said each element comprises replication properties that are required to prevent said each element;

restricting candidate replication technologies for said each element from replication technologies stored in a knowledgebase coupled to the computer system, wherein a resource configuration of the candidate replication technologies match the target environment configuration, and wherein replication properties of the candidate replication technologies match replication properties of said each element;

generating said at least one DR plan with candidate replication technologies for all elements based on best practice recipes and past deployment instances stored in the knowledgebase; and presenting, to the user, an output comprising said at least one DR plan from said generating.

7. The computer program product of claim 6, said ranging comprising:

dissecting the target computing environment into target environment constraints, wherein the target environment constraints comprise host constraints, storage constraints, middleware constraints, site constraints, and interconnectivity constraints;

anatomizing the disaster recovery requirements into said at least one element, wherein said replication properties of said at least one element comprise a recovery point objective (RPO) and a recovery time objective (RTO); and associating each element of said at least one element with a respective functional category and a respective location, wherein the respective functional category describes a mode of protection to meet said replication properties of said each element, and wherein the respective location describes a site of said each element that meets target environment constraints applicable to said each element.

8. The computer program product of claim 6, said generating comprising:

retrieving, from the knowledgebase, the best practice recipes and the past deployment instances, wherein the best practice recipes and the past deployment instances comprise said candidate replication technologies;

creating candidate disaster recovery (DR) plans by combining said candidate replication technologies according to sequences in an inclusion list of the best practice recipes; and selecting said at least one DR plan from created candidate DR plans by applying an exclusion list of the best practice recipe and the past deployment instances, wherein the exclusion list comprises sequences of replication technologies that should be avoided, wherein the past deployment instances specifies a respective deployed computing environment that is compatible with the target computing environment.

9. The computer program product of claim 8, further comprising:
receiving feedbacks on the output from the user, wherein said feedbacks comprise a rating for each disaster recovery (DR) plan of said at least one DR plan; and
updating the knowledgebase with respective ratings of the retrieved past deployment instances according to said feedbacks, wherein each past deployment instance of said past deployment instances comprises a rating, and wherein the rating comprises a user preference and a frequency of deployment of said each past deployment instance.

10. The computer program product of claim 6, wherein the output classifies said at least one disaster recovery (DR) plan based on a replication strategy and an architectural level of each DR plan of said at least one DR plan, wherein said each DR plan comprises a replication technology description, a cost, a rating, and a relevance, wherein the replication technology description describes replication technologies employed in said each DR plan, wherein the cost represents the cost of deploying said each DR plan, wherein the rating quantifies utilities of said each DR plan based on human evaluations, and wherein the relevance represents a proximity of a computing environment of said each DR plan to the target computing environment.

11. A computer system comprising a processor and a computer readable memory unit coupled to the processor, said computer readable memory unit containing instructions that when executed by the processor implement a method for automated disaster recovery (DR) planning, said method comprising:
receiving disaster recovery requirements and a target environment configuration from a user, wherein the target environment configuration defines a target computing environment in which at least one disaster recovery (DR) plan is to be deployed, and wherein the disaster recovery requirements defines objectives of said at least one DR plan;
a processor of a computer system ranging the disaster recovery requirements in at least one element, wherein each element of said at least one element is a unit risk in the target computing environment to protect with said at least one DR plan, wherein said each element comprises replication properties that are required to prevent said each element;
restricting candidate replication technologies for said each element from replication technologies stored in a knowledgebase coupled to the computer system, wherein a resource configuration of the candidate replication technologies match the target environment configuration, and wherein replication properties of the candidate replication technologies match replication properties of said each element;
generating said at least one DR plan with candidate replication technologies for all elements based on best practice recipes and past deployment instances stored in the knowledgebase; and
presenting, to the user, an output comprising said at least one DR plan from said generating.

12. The computer system of claim 11, said ranging comprising:
dissecting the target computing environment into target environment constraints, wherein the target environment constraints comprise host constraints, storage constraints, middleware constraints, site constraints, and interconnectivity constraints;
anatomizing the disaster recovery requirements into said at least one element, wherein said replication properties of said at least one element comprise a recovery point objective (RPO) and a recovery time objective (RTO); and
associating each element of said at least one element with a respective functional category and a respective location, wherein the respective functional category describes a mode of protection to meet said replication properties of said each element, and wherein the respective location describes a site of said each element that meets target environment constraints applicable to said each element.

13. The computer system of claim 11, said generating comprising:
retrieving, from the knowledgebase, the best practice recipes and the past deployment instances, wherein the best practice recipes and the past deployment instances comprise said candidate replication technologies;
creating candidate disaster recovery (DR) plans by combining said candidate replication technologies according to sequences in an inclusion list of the best practice recipes; and
selecting said at least one DR plan from created candidate DR plans by applying an exclusion list of the best practice recipe and the past deployment instances, wherein the exclusion list comprises sequences of replication technologies that should be avoided, wherein the past deployment instances specifies a respective deployed computing environment that is compatible with the target computing environment.

14. The computer system of claim 13, further comprising:
receiving feedbacks on the output from the user, wherein said feedbacks comprise a rating for each disaster recovery (DR) plan of said at least one DR plan; and
updating the knowledgebase with respective ratings of the retrieved past deployment instances according to said feedbacks, wherein each past deployment instance of said past deployment instances comprises a rating, and wherein the rating comprises a user preference and a frequency of deployment of said each past deployment instance.

15. The computer system of claim 11, wherein the output classifies said at least one disaster recovery (DR) plan based on a replication strategy and an architectural level of each DR plan of said at least one DR plan, wherein said each DR plan comprises a replication technology description, a cost, a rating, and a relevance, wherein the replication technology description describes replication technologies employed in said each DR plan, wherein the cost represents the cost of deploying said each DR plan, wherein the rating quantifies utilities of said each DR plan based on human evaluations, and wherein the relevance represents a proximity of a computing environment of said each DR plan to the target computing environment.

16. A process for supporting computer infrastructure, said process comprising providing at least one support service for at least one of creating, integrating, hosting, maintaining, and deploying computer-readable code in a computing system, wherein the code in combination with the computing system is capable of performing a method for automated disaster recovery (DR) planning, said method comprising:

receiving disaster recovery requirements and a target environment configuration from a user, wherein the target environment configuration defines a target computing environment in which at least one disaster recovery (DR) plan is to be deployed, and wherein the disaster recovery requirements defines objectives of said at least one DR plan;

a processor of a computer system ranging the disaster recovery requirements in at least one element, wherein each element of said at least one element is a unit risk in the target computing environment to protect with said at least one DR plan, wherein said each element comprises replication properties that are required to prevent said each element;

restricting candidate replication technologies for said each element from replication technologies stored in a knowledgebase coupled to the computer system, wherein a resource configuration of the candidate replication technologies match the target environment configuration, and wherein replication properties of the candidate replication technologies match replication properties of said each element;

generating said at least one DR plan with candidate replication technologies for all elements based on best practice recipes and past deployment instances stored in the knowledgebase; and presenting, to the user, an output comprising said at least one DR plan from said generating.

17. The process of claim 16, said ranging comprising:

dissecting the target computing environment into target environment constraints, wherein the target environment constraints comprise host constraints, storage constraints, middleware constraints, site constraints, and interconnectivity constraints;

anatomizing the disaster recovery requirements into said at least one element, wherein said replication properties of said at least one element comprise a recovery point objective (RPO) and a recovery time objective (RTO); and associating each element of said at least one element with a respective functional category and a respective location, wherein the respective functional category describes a mode of protection to meet said replication properties of said each element, and wherein the respective location describes a site of said each element that meets target environment constraints applicable to said each element.

18. The process of claim 16, said generating comprising:

retrieving, from the knowledgebase, the best practice recipes and the past deployment instances, wherein the best practice recipes and the past deployment instances comprise said candidate replication technologies;

creating candidate disaster recovery (DR) plans by combining said candidate replication technologies according to sequences in an inclusion list of the best practice recipes; and selecting said at least one DR plan from created candidate DR plans by applying an exclusion list of the best practice recipe and the past deployment instances, wherein the exclusion list comprises sequences of replication technologies that should be avoided, wherein the past deployment instances specifies a respective deployed computing environment that is compatible with the target computing environment.

19. The process of claim 18, further comprising:

receiving feedbacks on the output from the user, wherein said feedbacks comprise a rating for each disaster recovery (DR) plan of said at least one DR plan; and updating the knowledgebase with respective ratings of the retrieved past deployment instances according to said feedbacks, wherein each past deployment instance of said past deployment instances comprises a rating, and wherein the rating comprises a user preference and a frequency of deployment of said each past deployment instance.

20. The process of claim 16, wherein the output classifies said at least one disaster recovery (DR) plan based on a replication strategy and an architectural level of each DR plan of said at least one DR plan, wherein said each DR plan comprises a replication technology description, a cost, a rating, and a relevance, wherein the replication technology description describes replication technologies employed in said each DR plan, wherein the cost represents the cost of deploying said each DR plan, wherein the rating quantifies utilities of said each DR plan based on human evaluations, and wherein the relevance represents a proximity of a computing environment of said each DR plan to the target computing environment.

* * * * *